US012697897B1

(12) United States Patent
    Sylvester et al.

(10) Patent No.: US 12,697,897 B1
(45) Date of Patent: Aug. 4, 2026

(54) SYSTEMS AND COMPUTER-IMPLEMENTED METHODS FOR DYNAMIC WIRELESS CHARGING

(71) Applicant: INTEGRATED ROADWAYS IP LLC, Miami Beach, FL (US)

(72) Inventors: Tim Sylvester, Kansas City, MO (US); Tiziano Pedersoli, Overland Park, KS (US)

(73) Assignee: INTEGRATED ROADWAYS IP LLC, Miami Beach, FL (US)

( * ) Notice: Subject to any disclaimer, the term of this patent is extended or adjusted under 35 U.S.C. 154(b) by 389 days.

(21) Appl. No.: 18/312,776

(22) Filed: May 5, 2023

(51) Int. Cl.
| | |
|---|---|
| *B60L 53/62* | (2019.01) |
| *B60L 53/12* | (2019.01) |
| *B60L 53/63* | (2019.01) |
| *B60L 53/65* | (2019.01) |
| *B60L 53/66* | (2019.01) |
| *B60L 53/68* | (2019.01) |
| *H02J 7/00* | (2006.01) |
| *H02J 50/10* | (2016.01) |
| *H02J 50/80* | (2016.01) |
| *H02J 50/90* | (2016.01) |

(52) U.S. Cl.
CPC .............. *B60L 53/68* (2019.02); *B60L 53/12* (2019.02); *B60L 53/62* (2019.02); *B60L 53/63* (2019.02); *B60L 53/65* (2019.02); *B60L 53/665* (2019.02); *H02J 7/00712* (2020.01); *H02J 7/007192* (2020.01); *H02J 50/10* (2016.02); *H02J 50/80* (2016.02); *H02J 50/90* (2016.02); *B60L 2240/12* (2013.01); *B60L 2240/54* (2013.01)

(58) Field of Classification Search
CPC .......... B60L 53/68; B60L 53/12; B60L 53/62; B60L 53/63; B60L 53/65; B60L 53/665; B60L 2240/12; B60L 2240/54; H02J 7/00712; H02J 7/007192; H02J 50/10; H02J 50/80; H02J 50/90
See application file for complete search history.

(56) References Cited

U.S. PATENT DOCUMENTS

| | | | | |
|---|---|---|---|---|
| 6,421,600 | B1 | 7/2002 | Ross | |
| 7,451,839 | B2 | 11/2008 | Perlman | |
| 12,208,700 | B2 * | 1/2025 | Lee .......................... | B60L 53/62 |
| 2009/0045773 | A1 | 2/2009 | Pandya et al. | |
| 2010/0274570 | A1 * | 10/2010 | Proefke ................... | B60L 53/67 |
| | | | | 701/22 |

(Continued)

FOREIGN PATENT DOCUMENTS

| | | | | | |
|---|---|---|---|---|---|
| CN | 109606144 A | * | 4/2019 | .............. | H02J 50/60 |
| EP | 3187838 A1 | * | 7/2017 | ........... | G01G 19/024 |
| KR | 20200056761 A | * | 5/2020 | .............. | H02J 50/90 |

*Primary Examiner* — Santosh R Poudel
(74) *Attorney, Agent, or Firm* — Fredrikson & Byron, P.A.

(57) ABSTRACT

A wireless charging system for a road that includes a wireless power charger embedded within the road. The wireless power charger is configured to induce wireless charging in a vehicle. An electronic acquisition device comprising at least one of a communication element and a sensor is configured to obtain vehicle position data regarding the vehicle traveling on the road. At least one control processor in communication with the electronic acquisition device and the wireless power charger is configured to control the wireless power charger based on the vehicle position data received via the electronic acquisition device.

17 Claims, 9 Drawing Sheets

(56)     References Cited

U.S. PATENT DOCUMENTS

| 2014/0238804 | A1 | 8/2014 | Vietzke et al. | |
| 2015/0028849 | A1* | 1/2015 | Covic | H02J 50/10 |
| | | | | 324/76.11 |
| 2015/0225906 | A1 | 8/2015 | Curran et al. | |
| 2015/0303714 | A1 | 10/2015 | Keeling et al. | |
| 2015/0364944 | A1 | 12/2015 | Garcia Briz et al. | |
| 2016/0023557 | A1* | 1/2016 | Dimke | B60L 53/36 |
| | | | | 320/108 |
| 2019/0033143 | A1* | 1/2019 | Teil | G01L 1/16 |
| 2019/0381903 | A1* | 12/2019 | Shin | G07F 15/005 |
| 2021/0222375 | A1 | 7/2021 | Sylvester | |
| 2022/0363149 | A1 | 11/2022 | Copeland | |
| 2023/0021364 | A1 | 1/2023 | Hirano et al. | |
| 2023/0166617 | A1* | 6/2023 | Lee | B60L 53/66 |
| | | | | 701/22 |

* cited by examiner

SYSTEMS AND COMPUTER-IMPLEMENTED METHODS FOR DYNAMIC WIRELESS CHARGING

CROSS-REFERENCE TO RELATED APPLICATIONS

The present application is filed contemporaneously with identically-titled U.S. patent application Ser. Nos. 18/312,760 and 18/312,791, filed May 5, 2023, the entire disclosures of which are hereby incorporated by reference herein.

FIELD OF THE INVENTION

Embodiments of the present invention relate to wireless charging systems for roads. More particularly, embodiments of the present invention relate to a wireless charging system configured to control a wireless power charger based on real-time status data.

BACKGROUND

Recent advances in electric motors and electrical power storage have facilitated an increase in the manufacture and use of electric vehicles, some of which implement autonomous and/or self-driving technologies. Previously, electric vehicles were dependent on being recharged at periodic or regular intervals. For example, for a daily-commuter electric vehicle, the vehicle's battery would generally be recharged at the operator's home overnight. Alternatively, for a long-haul electric vehicle, the vehicle's battery would generally be recharged periodically, at stops during the trip, once the battery level of the vehicle had been sufficiently depleted. Unfortunately, such periodic charging of electric vehicles is inconvenient and burdensome for the operator. For instance, the single charge range of the daily-commuter electric vehicle can place restrictions on how far the operator can commute each day. Similar inconveniences are present with the long-haul electric vehicle. Further, the charging time needed to recharge an electric vehicle once stopped at a charging station can necessitate a significant increase in travel time for the operator of the long-haul electric vehicle. Furthermore, many geographic locations have limited charging stations, which can make it difficult for electric vehicle operators to find suitable locations to charge.

In view of the above, it would be beneficial to provide charging systems that can recharge vehicles (e.g., the batteries of electric vehicles) during travel, so as to increase the range of the electric vehicles without requiring the additional time and cost associated with stopping the electric vehicles to recharge (e.g., at home, at work, or otherwise at charging stations). In particular, there is a need for wireless charging systems for roads, which can wirelessly charge vehicles as the vehicles travel on the roads.

SUMMARY OF THE INVENTION

Embodiments of the present invention address one or more of the above-mentioned problems and provide a distinct advance in the art of charging vehicles, and particularly electric vehicles. Specifically, embodiments of the present invention may provide a wireless charging system for a road. The wireless charging system comprises a wireless power charger embedded within the road. The wireless power charger is configured to induce wireless charging in a vehicle. An electronic acquisition device comprising at least one of a communication element and a sensor is configured to obtain vehicle position data regarding the vehicle traveling on the road. At least one control processor in communication with the electronic acquisition device and the wireless power charger is configured to control the wireless power charger based on the vehicle position data received via the electronic acquisition device.

Embodiments of the present invention may also provide a method of wirelessly charging a vehicle traveling on a road. The method includes: obtaining, via an electronic acquisition device comprising at least one of a communication element and a sensor, vehicle position data regarding the vehicle traveling on the road; and controlling a wireless power charger embedded in the road based on the vehicle position data via at least one control processor in communication with the electronic acquisition device and the wireless power charger.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
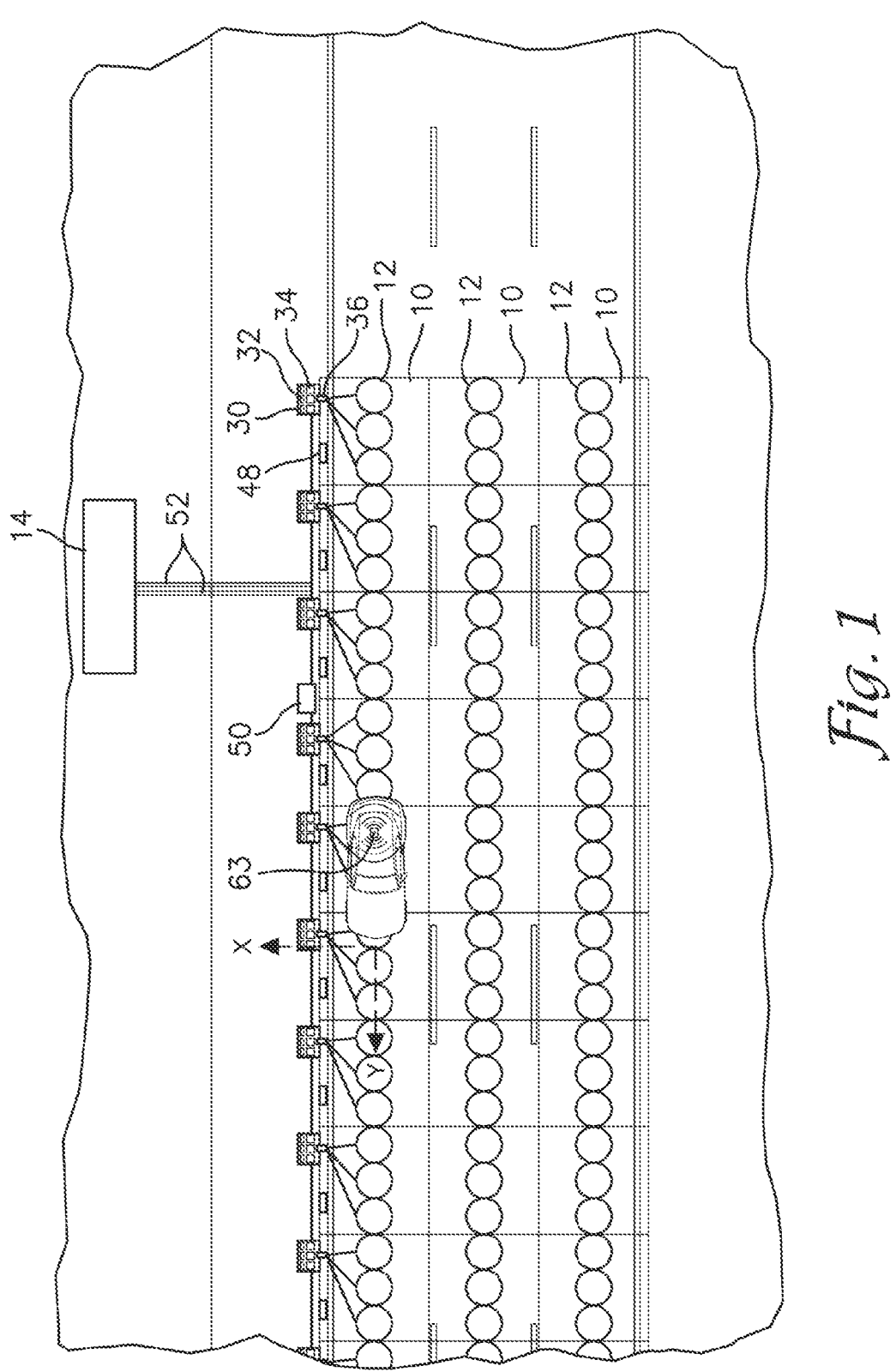
FIG. 1 is a top schematic view of a wireless charging system for a road according to embodiments of the present invention, particularly illustrating the system transmitting wireless power to a vehicle traveling on a surface of the road.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms retain their commonly accepted definitions and are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

Exemplary System

Embodiments of the present invention include a wireless charging system for a road. Such a wireless charging system and road may be described elsewhere herein as a "pavement system." FIG. 1 illustrates an exemplary pavement system in accordance with embodiments of the present invention. In more detail, the pavement system includes a plurality of roadway sections 10, illustrated in FIGS. 1-4 and 6, aligned along a longitudinal or y-axis corresponding to a direction of travel of vehicles or other masses across top surfaces of the roadway sections 10. The illustrative pavement system includes three (3) lanes, each being respectively formed from a plurality of roadway sections 10 aligned along the y-axis. Each lane may include one or more roadway sections 10. It is foreseen that the pavement system may include more or fewer lanes without departing from the spirit of the present invention.

The roadway sections 10 may be pre-cast slabs comprising concrete paving material, described in the exemplary embodiments in more detail below. It should be noted, however, that in one or more embodiments the pavement system may comprise one or more lanes formed of cast-in-place concrete installations, continuous pour asphalt pavement material, or other pavement types. In cast-in-place installations, roadway sections may include one or more lengths of roadway separated by saw cut joints, typically made to reduce the chances of roadway damage/cracking from cyclical expansion and contraction.

Each roadway section 10 of the illustrated embodiment may include three (3) wireless power chargers 12. The wireless power chargers 12 may include or comprise wireless charge emitters and/or transceivers. Each wireless charge emitter and/or transceiver preferably includes one or more inductive coil(s) or layers of conductive material (See FIGS. 3A, 3B) configured to conduct current of supplied power in a spatial pattern that generates and projects an electromagnetic (EMF) field extending up and above the top surface of the corresponding roadway section 10 for wireless battery charging of passing vehicles (e.g., according to Faraday's law of induced voltage). Each of the wireless power chargers 12 may be configured for unidirectional charging of batteries of vehicles passing along a top surface of the roadway sections 10 or for bidirectional charging in communication with electrical circuits positioned on or adjacent to the top surface of the slabs. One of ordinary skill will appreciate that an individual slab or roadway section 10 may include more or fewer wireless power chargers 12, at different and/or variable spacing and/or of different configuration/shape, without departing from the spirit of the present invention.

In one or more embodiments, each of the wireless battery chargers 12 includes a conductive element (e.g., one or more inductive coil(s) or layers of conductive material discussed above) for generating the magnetic field, the conductive element being covered by an outer, electrically insulating material or shroud comprising, e.g., rubber, resin or other polymer, or the like.

Figure 5:
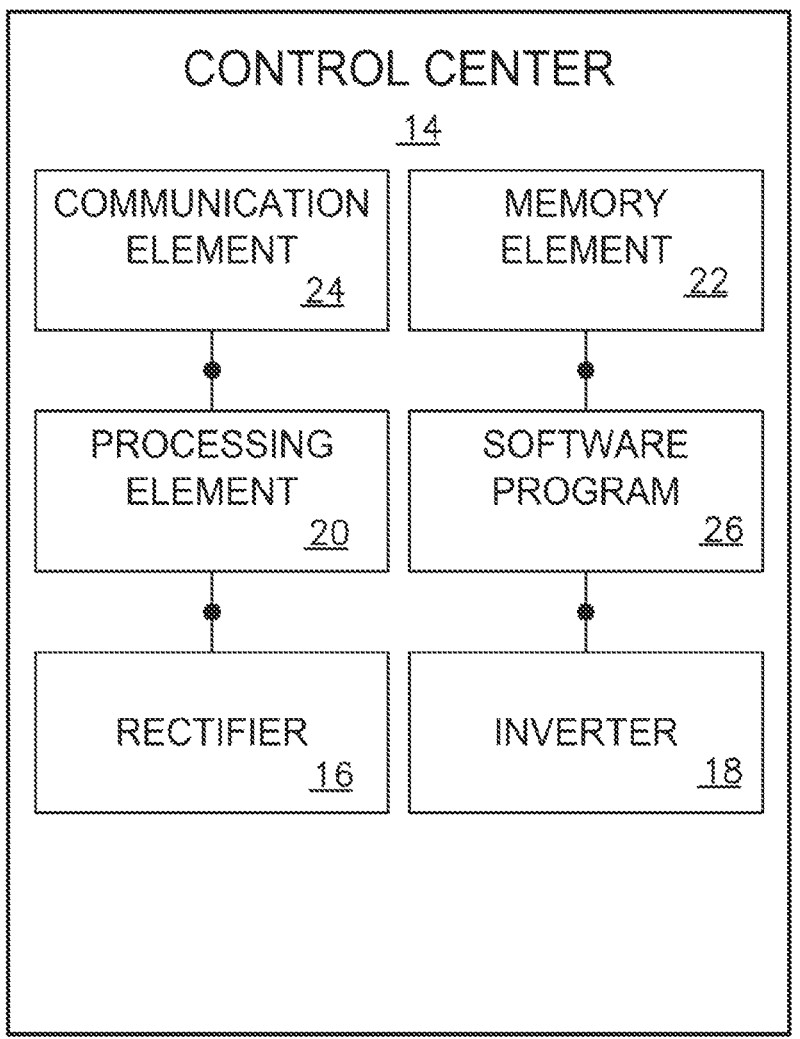
FIG. 5 is a schematic block diagram of a control center of the wireless charging system from FIG. 1.

Power to the wireless power chargers 12 is supplied, conditioned, tuned, transformed, converted and/or otherwise changed and/or controlled by one or more control centers 14, as illustrated in FIG. 1. Turning briefly to FIG. 5, each control center 14 may include a rectifier 16, an inverter 18, a processing element 20, a memory element 22, a communication element 24, and a software program 26, each of which is discussed in more detail below. It should also be noted that one or more components of a control center 14 may be housed remotely and/or embedded in or with components of a roadway section 10 without departing from the spirit of the present invention.

The control center 14 receives power from a power supply such as a public utility line and/or from upstream switchgear (not shown), and prepares same for supply to the wireless power chargers 12. For example, in one or more embodiments, the control center 14 receives alternating current (AC) power at 750 KW and 110A, and increases the frequency of the power using the rectifier 16 and inverter 18 for supply to the wireless power chargers 12.

The control center 14 may initially supply power to junction boxes 30, which may each include one or more switching devices 32 and tuning network devices 34. The switching device(s) 32 and corresponding tuning network device(s) 34 may serve as intermediate components for electrical communication between the wireless power chargers 12 and the control center 14. One of ordinary skill will appreciate that more, fewer and/or different intermediate components may be used to supply power to the wireless power chargers 12 without departing from the spirit of the present invention. The exemplary junction boxes 30 are adjacent the sides of the corresponding roadway sections 10 and may be set or embedded in a shoulder of the roadway, with top portions approximately flush with the top surface of the roadway to provide periodic access thereto for maintenance.

In more detail, each junction box 30 may be configured to provide power from the control center 14 to at least one of the roadway sections 10. As such, each junction box 30 may contain or include one or more switching device(s) 32 and corresponding tuning network device(s) 34, with each pair of switching device 32 and tuning network device 34 supplying power to one of the wireless power chargers 12 of a given roadway section 10. Thus, for example, in embodiments in which the roadway sections 10 each include three (3) wireless power chargers 12, each junction box 30 may include three (3) pairs of switching devices 32 and tuning network devices 34. The switching device 32 may, for example, be a metal-oxide-semiconductor field-effect transistor (MOSFET) switch or any other switch device for switching and/or amplifying the power signal to the corresponding wireless power charger 12. The tuning network device 34 may, for example, be a transformer configured to increase or decrease the voltage and/or other characteristics of the power for supply to the corresponding wireless power charger 12. The wires or conductors carrying the power to the wireless power chargers 12 from the junction boxes 30 may be routed through one or more conduits and/or edge connectors 36 illustrated in FIG. 1. In one or more embodiments, adjacent roadway sections 10 in different lanes (i.e., adjacent along the x-axis) may be connected via edge connectors 36 such that a given junction box 30 may facilitate power distribution and/or communication with such adjacent roadway sections 10.

Returning to the control center 14, in one or more embodiments, the processing element 20, the memory element 22, the communication element 24 and/or the software program 26 comprise a master controller. The master controller may be in electronic communication (e.g., via the communication element 24) with one or both of the switching devices 32 and/or tuning network devices 34 (of the junction boxes 30) corresponding to each of the wireless power chargers 12 of the pavement system. The electronic communication may permit such electronic devices in each of the junction boxes 30 to provide data regarding operation and/or faults of the wireless power chargers 12 and/or supporting power supply or control infrastructure and/or intermediate components. The electronic communication may also or alternatively permit the master controller to communicate commands to the junction box 30 electronic components and/or components of the wireless power chargers 12, for example where the master controller commands one or more switching device(s) 32 to power or shut down power to the corresponding wireless power charger(s) 12 or commands one or more tuning network device(s) 34 to increase or decrease the voltage of the power supplied to the corresponding wireless power chargers 12. As will be appreciated from FIG. 1, a single control center 14 may control power to wireless power chargers 12 of multiple sections 10, and control centers 14 may be in communication with one another and/or with external devices, which is discussed in more detail below in connection with FIG. 7.

Figure 2:
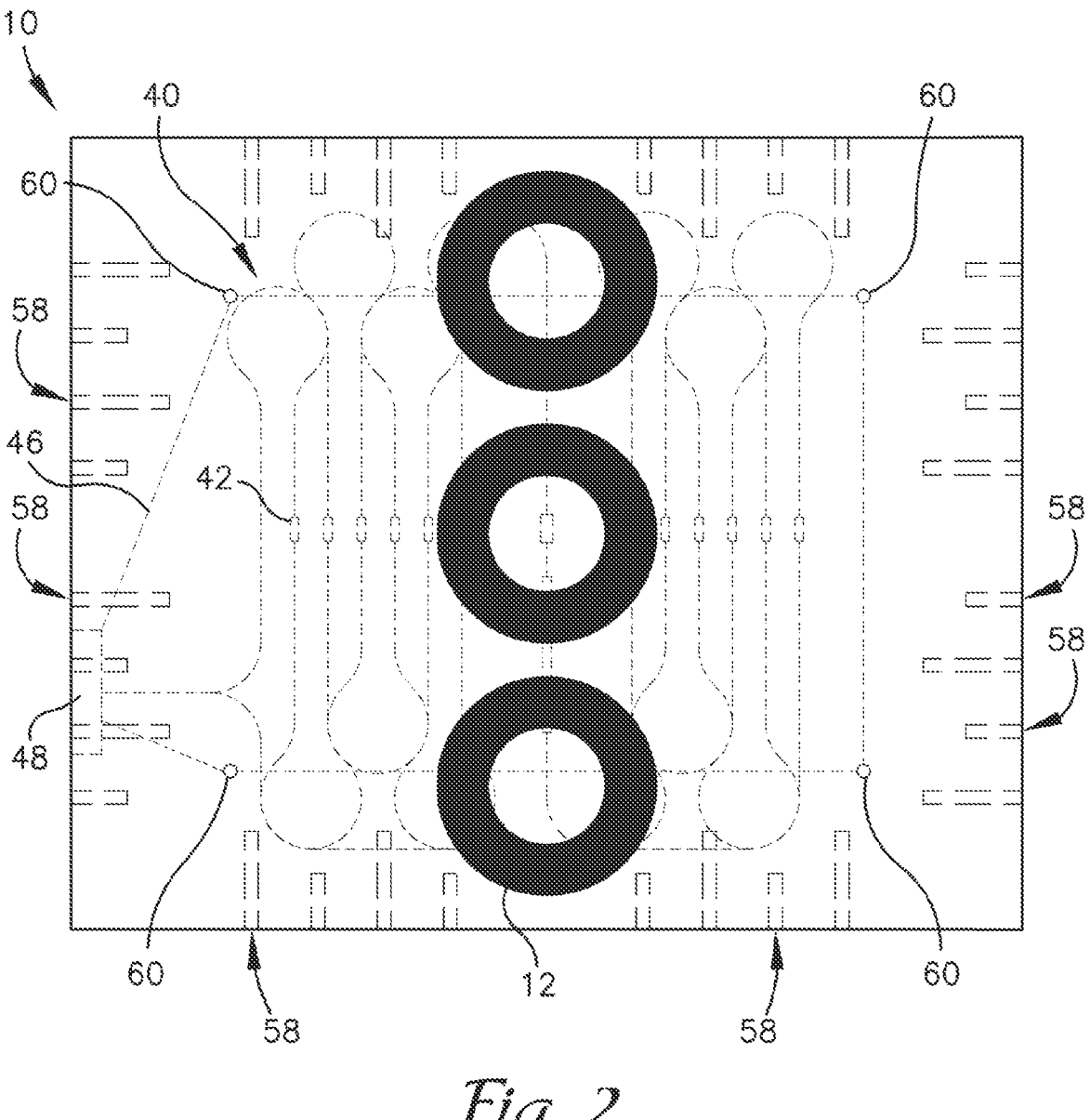
FIG. 2 is a top schematic view of a roadway section from the wireless charging system from FIG. 1, particularly illustrating a strain sensor array and a plurality of wireless power chargers embedded within the roadway section.

Turning to FIG. 2, in one or more embodiments, each roadway section 10 includes a strain sensor array 40. The strain sensor array 40 is distributed at least partly, and preferably mostly, across the length and width of a body of the roadway section 10, the body comprising pavement material such as concrete or asphalt. The strain sensor array 40 may include one or more optical fiber sensors 42. The strain sensor array 40 may embody optical fiber sensing technologies including but not limited to one or more of Rayleigh, Brillouin, Raman, or Fiber Bragg Grating (FBG) technologies, with corresponding sensors 42 or sampling area(s) distributed along the length of the fiber(s).

In one or more embodiments comprising FBGs, the FBGs are positioned in the optical fiber with selectable space therebetween. Each FBG, or any other method implemented as described above but not limited to those specifically named, provides a measurement of the strain of its surrounding environment, which is a local volume, element or region of the body of the roadway section 10. It should be noted that emitters and receivers of optical fiber sensors 42 may comprise a single device or multiple devices. Generally, each FBG reflects an optical signal, of a particular wavelength or small band of wavelengths, that it receives. The characteristics, such as intensity, amplitude, wavelength, and/or time delay, of the optical signal reflection may vary according to a strain, potentially among other factors, placed on the FBG. One of ordinary skill will appreciate that various mechanisms for detecting strain—including mechanisms for detecting strain using other optical fiber sensing technologies—may be employed in the strain sensor array 40 within the scope of the present invention.

The optical fibers of the array 40 shown in FIG. 2 are implemented in elongated loops with enlarged turns on each end, with the loops being arranged in an alternating pattern offset relative to adjacent loops along the y-axis. However, one of ordinary skill will appreciate that sensors may be implemented within a body of pavement material in other patterns—for example, in a serpentine pattern layout, a coil pattern layout, a grid pattern, an array of individual fiber optic lines, or other geometric pattern layouts—without departing from the spirit of the present invention. Moreover, a sensor array 40 may include more or fewer optical fibers and/or may comprise additional or alternative strain sensors (e.g., piezoelectric strain sensors) without departing from the spirit of the present invention.

In one or more embodiments, the strain sensor array 40 may extend, within its respective roadway section 10, no less than fifty percent (50%), no less than sixty percent (60%), no less than seventy percent (70%), no less than eighty percent (80%), no less than ninety percent (90%), and/or no less than one-hundred percent (100%) of the length of the roadway section 10. Similarly, the strain sensor array 40 may extend, within its respective roadway section 10, no less than fifty percent (50%), no less than sixty percent (60%), no less than seventy percent (70%), no less than eighty percent (80%), no less than ninety percent (90%), and/or no less than one-hundred percent (100%) of the width of the roadway section 10. Stated differently, the roadway section 10 (which may be formed as a precast slab) has a perimeter defined by a plurality of sides and the strain sensor array 40 is distributed along at least fifty percent (50%) (or at least sixty percent (60%), or at least seventy percent (70%), or at least eighty percent (80%), or at least ninety percent (90%), or at least one-hundred percent (100%)) of a length of the precast slab as defined along the first dimension inside the perimeter and along at least fifty percent (50%) (or at least sixty percent (60%), or at least seventy percent (70%), or at least eighty percent (80%), or at least ninety percent (90%), or at least one-hundred percent (100%)) of a width of the precast slab as defined along the second dimension inside the perimeter.

The sensor array 40 may include and/or be in communication with supporting components—such as an embedded interrogator—within the scope of the present invention. For example, embodiments of the present invention are interoperable with the paving systems and sensor array(s) described in U.S. Patent Publication 2021/0222375 A1 to Sylvester, filed Apr. 9, 2021, and in U.S. patent application Ser. No. 18/048,886 to Sylvester, filed Oct. 24, 2022, each of which is hereby incorporated by reference herein in its entirety. In one or more embodiments, the control center 14 is in electronic communication (e.g., via the communication element 24) with an interrogator which, in turn, operates in conjunction with the fiber optic sensors 42 of the sensor array 40 to generate sensor data. As described in more detail below, the sensor data may include information indicative of a vehicle traveling and/or passing on the top surface of the roadway section 10.

The total number of sensors 42 in the sensor array 40, as well as the positions of the sensor within the roadway section 10, may be selected based at least in part on their respective intended utility and usage. For example, in connection with configuring a roadway section 10 to read transient signals from a vehicle passing over the roadway section 10, the number, size, and placement of the sensors 42 of the sensory array 40 may be chosen to ensure the sensor array 40 is capable of sufficiently detecting and identifying individual vehicle tires, as well as measuring the location, weight, and dimensions of those tires.

Figure 4:
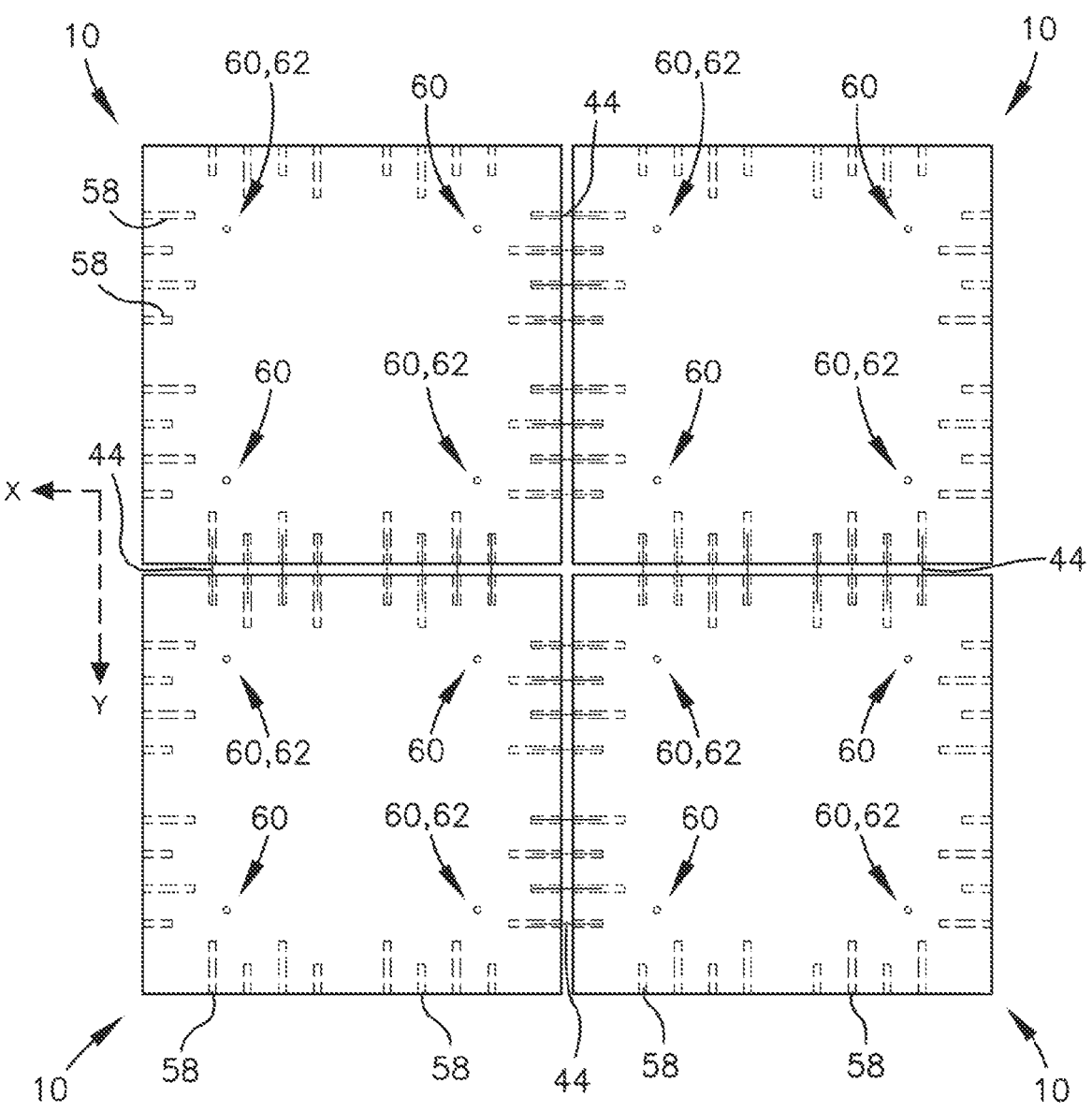
FIG. 4 is a top schematic view of four roadway sections interconnected via load-transferring connectors according to embodiments of the present invention.

Turning briefly to FIG. 4, the roadway sections 10 of the illustrated embodiment also include structural links comprising load-transferring connectors 44 (e.g., dowel rods), discussed in more detail below. However, it should be noted that the paving material of the roadway and delineations between sections 10 or sensing volumes, and associated structural components, may vary within the scope of the present invention. For example, cast-in-place concrete sections delineated by saw cut joints (e.g., without load-transferring connectors), or continuous pour installations (e.g., comprising asphalt without reinforcement layers or load-transferring connectors) are also within the scope of the present invention.

In one or more embodiments, a sensing volume of a section of pavement (e.g., a roadway section 10) may comprise an area of the roadway monitored by a sensor array 40 comprising fiber optic cable(s) and one or more interrogator(s), where each interrogator transmits and receives optical signals reflecting stress and strain in the section. In one or more embodiments, a sensing volume of a section of pavement comprises an area of the roadway delineated by physical boundaries comprising the sides of a precast slab or a combination of saw cut joints and sides of a cast-in-place concrete installation (either of which may be in the form of a roadway section 10).

An advantage of the precast roadway sections 10 of the illustrated embodiment is realized through added data dimensionality available through monitoring condition and/or strains across multiple sensor arrays 40 respectively corresponding to multiple roadway sections 10 interconnected with load-transferring connectors 44 extending therebetween.

However, it is also foreseen that a sensor array 40 may be omitted, alternatively configured or replaced by other sensing technologies without departing from the spirit of the present invention.

Returning to FIG. 1, the master controller of the control center 14 may additionally be in electronic communication (e.g., via wired connections, 46 of FIG. 2) with and may receive strain sensor data from the strain sensor arrays 40 embedded in the roadway sections 10. The wired connections 46 may be routed via edge connectors 48 through one or more junction boxes 50 illustrated in FIG. 1 for communication to the master controller (i.e., the control center 14). The master controller may communicate with and/or provide power to the components of the pavement system via wired connections 52. As such, the master controller may analyze the strain sensor data, alone and/or in communication with one or more remote server(s), to determine vehicle position on the pavement system and roadway sections 10 and/or vehicle speed and, accordingly, provide commands for activation/deactivation of the wireless power chargers 12 and/or increasing or decreasing the voltage supplied to the wireless power chargers 12.

In view of the above, embodiments of the present invention are configured to sense when a vehicle is travelling over the road and wirelessly charge the vehicle at least in part in response to such sensing. In particular, embodiments of the present invention include a strain sensor array 40 embedded within the road, with the strain sensor array 40 being configured to generate data (e.g., strain data) regarding strains and/or stresses on the road corresponding to the vehicle passing and/or driving on the top surface of the road. Thus, the strain sensor array 40 is configured to sense when a vehicle is traveling on the road.

As noted above, one or more embodiments include a wireless power charger 12 embedded within the road, with the wireless power charger 12 being configured to induce wireless charging in the vehicle. Embodiments further include at least one control processor, such as processing element 20 of the control center 14, in communication with the strain sensor array 40 and the wireless power charger 12. As such, the control processor may be configured to control the wireless power charger 12 (e.g., activate or deactivate the wireless power charger 12) based on the data received from the strain sensor array 40 and/or based on other data. Specifically, for example, when the strain sensor array 40 senses that the vehicle is (or will soon be) traveling on the road, and particularly on the roadway section 10 within which the strain sensor array 40 is embedded, the control processor can instruct the wireless power charger 12 (within the particular roadway section 10 or within a downstream roadway section 10) to generate an EMF field to induce wireless charging in the vehicle. Specifically, the wireless power charger 12 can generate the EMF field upward above the top surface of the road to be received by the inductive components associated with the vehicle to cause wireless charging of the vehicle's battery. Furthermore, in one or more embodiments, the strain sensor array 40 is positioned below the wireless power charger 12, as illustrated in FIG. 2, such that the components of the strain sensor array 40 will not interfere with the EMF field generated by the wireless power charger 12.

Figure 3A:
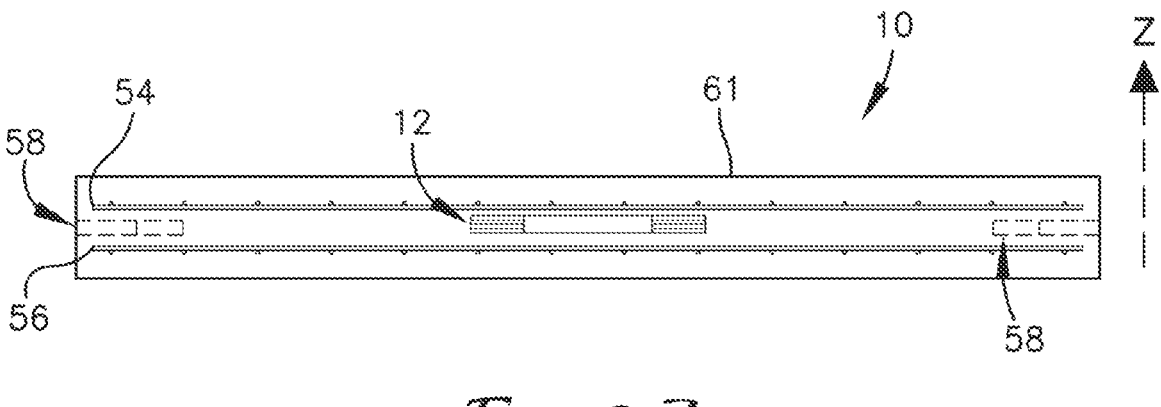
FIG. 3A is a cross-sectional view of one of the roadway sections of FIG. 1, cut along a vertical plane bisecting one of the wireless battery chargers and further illustrating an upper reinforcement layer and a lower reinforcement layer.
Figure 3B:
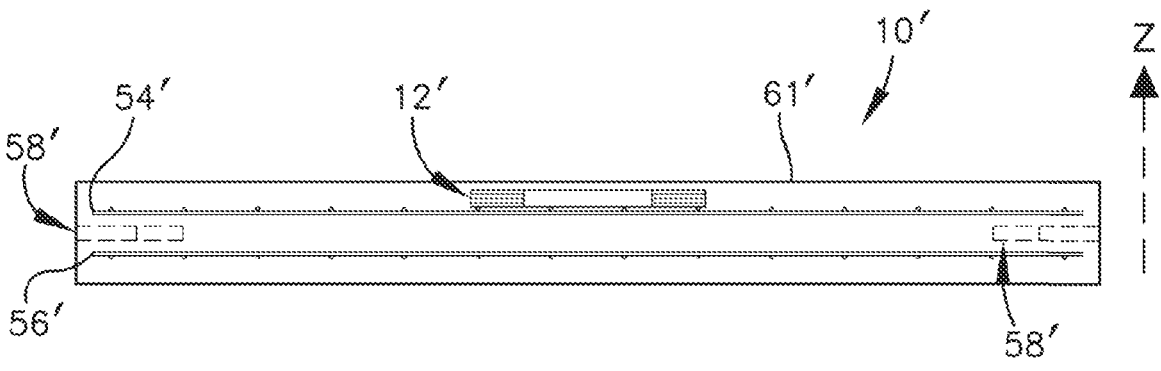
FIG. 3B is a cross-sectional view of an alternative roadway section from the pavement system of FIG. 3A, particularly illustrating a plurality of reinforcement layers positioned below the wireless battery charger and omitting layer(s) positioned above the charger.

With reference to FIGS. 3A and 3B, the roadway sections 10 may also each include one or more internal reinforcement layers 54, 56 embedded therein. Although the reinforcement layers 54, 56 may have various shapes and sizes, in one or more embodiments, the reinforcement layers 54, 56 may comprise a framework of spaced rods, bars, or other elongated elements that are parallel to and/or that cross each other, such as in the form of a grid or a grating.

In one or more embodiments, the internal reinforcement layers 54, 56 may each extend, within its respective roadway section 10, no less than fifty percent (50%), no less than sixty percent (60%), no less than seventy percent (70%), no less than eighty percent (80%), no less than ninety percent (90%), and/or no less than one-hundred percent (100%) of the length of the roadway section 10. Similarly, the internal reinforcement layers 54, 56 may each extend, within its respective roadway section 10, no less than fifty percent (50%), no less than sixty percent (60%), no less than seventy percent (70%), no less than eighty percent (80%), no less than ninety percent (90%), and/or no less than one-hundred percent (100%) of the width of the roadway section 10.

US 12,697,897 B1

9

Stated differently, the roadway section 10 (which may be formed as a precast slab) has a perimeter defined by a plurality of sides and the reinforcement layers 54, 56 are distributed along at least fifty percent (50%) (or at least sixty percent (60%), or at least seventy percent (70%), or at least eighty percent (80%), or at least ninety percent (90%), or at least one-hundred percent (100%)) of a length of the precast slab as defined along the first dimension inside the perimeter and along at least fifty percent (50%) (or at least sixty percent (60%), or at least seventy percent (70%), or at least eighty percent (80%), or at least ninety percent (90%), or at least one-hundred percent (100%)) of a width of the precast slab as defined along the second dimension inside the perimeter.

As illustrated in FIG. 3A, the reinforcement layer 54 may be positioned, within a given roadway section 10, above the wireless power chargers 12 of the roadway section 10, and the reinforcement layer 54 may be referred to as an upper reinforcement layer 54. Correspondingly, the reinforcement layer 56 may be positioned, within the given roadway section 10, below the wireless power chargers 12 of the roadway section 10, and the reinforcement layer 56 may be referred to as a lower reinforcement layer 56.

In one or more embodiments, the reinforcement layers 54, 56 may comprise at least one layer of metal lattice (e.g., steel or iron rebar) or other internal reinforcement structures such as fiberglass reinforcement mat; geotechnical mat; composite rebar, rods, mats, or structures; polymer rebars, rods, mats, or structures; ferrite rebars, rods, mats, or structures; carbon fiber mat, or loose reinforcement material such as fiberglass fibers, carbon fibers, plastic fibers, or metallic shavings. However, in one or more embodiments, the upper internal reinforcement layer 54 is embedded nearer to the top surface of the roadway section than the wireless battery charger(s) 12 and may be comprised of only those non-magnetic shielding materials listed above or otherwise which are non-metallic, non-ferrite material(s) that will not substantially interfere with, shield against, insulate and/or isolate the electromagnetic field (EMF) emitted upward from the wireless power chargers 12, which are positioned below the upper internal reinforcement layers 54.

For instance, in some specific embodiments, the upper reinforcement layer 54 may be comprised of polymer rebars, bars, mats, or other structures. In other embodiments, the upper reinforcement layer 54 may comprise non-magnetic shielding metals, such as aluminum, copper, brass, gold, silver, titanium, or tungsten. In contrast, the lower reinforcement layer 56 may be comprised of any of the above-listed materials, including any of the magnetic shielding materials or non-magnetic shielding materials. For instance, the lower internal reinforcement layer 56 may be comprised of ferrite, as well as ferrous materials (e.g., iron). Furthermore, it is contemplated that either (or both) of the upper and lower reinforcement layers 54, 56 may be formed from materials that are electrically conductive, thermally conductive, or both.

Broadly, it should be noted that a roadway section or slab may include one or more reinforcement grids or layers above and/or one or more reinforcement layers below the embedded wireless battery charger(s). Also or alternatively, reinforcement layers may be omitted from portion(s) above and/or from portion(s) below the wireless battery chargers within the scope of the present invention. For example, and with brief reference to FIG. 3B, in one or more embodiments a plurality of reinforcement layers, including an uppermost reinforcement layer 54' and a lower reinforcement layer 56', may be embedded below wireless battery charger 12', with no reinforcement layers being embedded above the wireless battery charger 12'. Such reinforcement layers may comprise magnetic shielding material and/or non-magnetic shielding material within the scope of the present invention. One of ordinary skill will appreciate that other variations on number and positioning of layers are within the scope of the present invention.

More broadly, it is foreseen that embodiments of the present inventive concept, including the upper and lower reinforcement layers 54, 56, are interoperable with the paving systems and apparatuses described in U.S. Patent Publication No. 2016/0222594 A1 to Sylvester (filed Mar. 30, 2016), and in U.S. Patent Publication No. 2017/0191227 A1 to Sylvester (filed May 16, 2016), each of which is hereby incorporated by reference herein in its entirety.

As noted above, in one or more embodiments, load-transferring connectors 44 (see FIG. 4) may be set in cavities 58 formed in the roadway sections 10 to join the roadway sections 10 to one another (or other adjacent structures) along sides extending perpendicular to the direction of travel (i.e., in the "x" direction). In one or more embodiments, load-transferring connectors 44 also join the roadway sections 10 to one another (or other adjacent structures) along sides extending parallel to the direction of travel (i.e., in the "y" direction). The load-transferring connectors 44 may comprise, for example, dowel rods. However, in one or more embodiments, roadway sections 10 adjacent one another in the "x" direction may be joined using tie bars (not shown) or other load-transferring connectors. Interfaces between roadway sections 10 may also or alternatively incorporate a rubber skirt, backer board, spacing rod, tar mixture, grouting or similar buffering substance within the scope of the present invention. It is also foreseen that load-transferring connectors may be omitted along one or more sides of slabs or roadway sections without departing from the spirit of the present invention.

Figure 6:
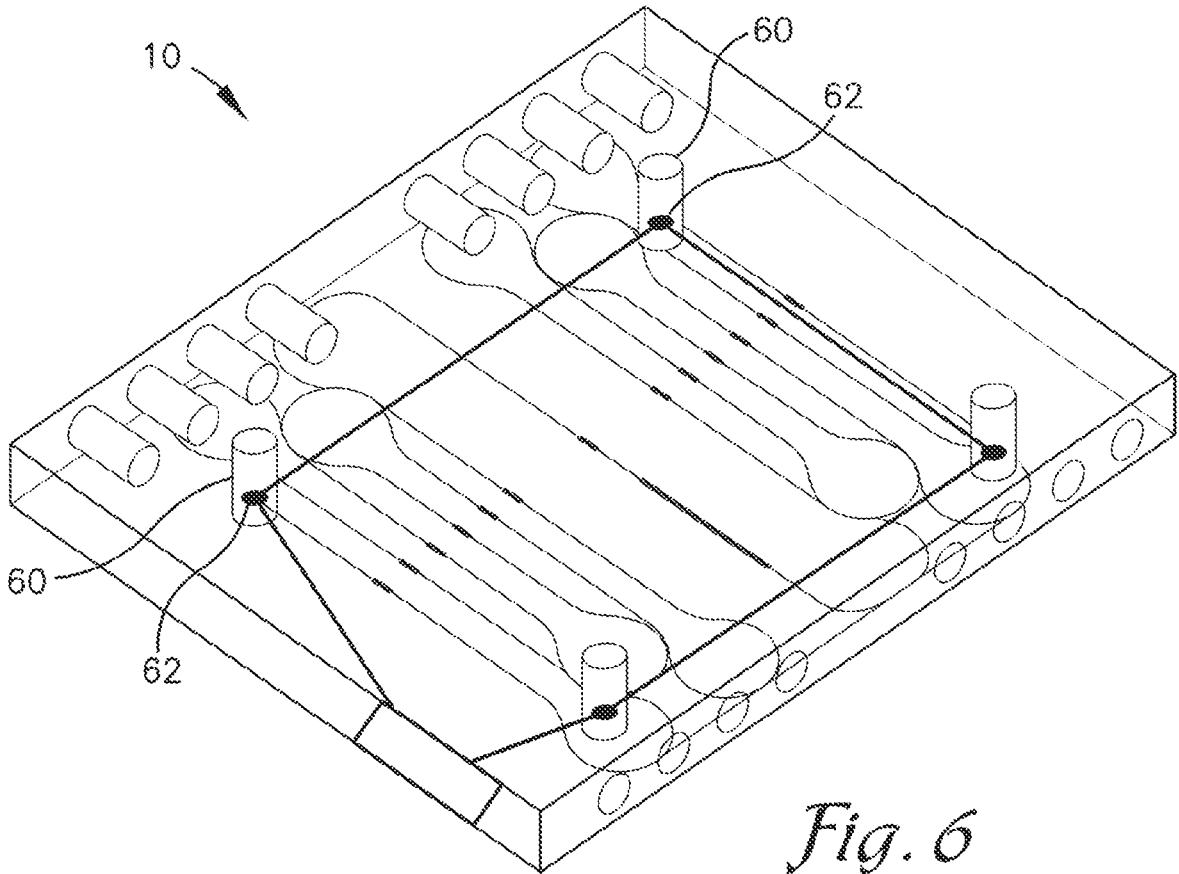
FIG. 6 is an elevated schematic view of a roadway section of the wireless charging system from FIG. 1, particularly illustrating communication elements positioned within access ports formed through a thickness of the roadway section.

Further, as illustrated in FIG. 6, one or more of the roadway sections 10 may include a plurality of access ports 60 embedded within the roadway section 10, and in one or more embodiments positioned below the upper surface 61 of the roadway section 10. The access ports 60 may comprise cavities extending generally vertically at least partly through a thickness of the roadway section 10. In one or more embodiments, the access ports 60 may house embedded lifting receivers (not shown) and may be spaced about the roadway section 10 for balanced lifting of the roadway section 10 (e.g., one access port 60 in each of four quadrants of the roadway section 10). Access ports 60 may also permit fluid communication between upper and bottom surfaces and may be configured to house and/or provide access to other sensing equipment without departing from the spirit of the present invention. For example, in one or more embodiments the access ports 60 may house one or more communication elements 62, which are configured to communicate with wireless communication elements 63 of vehicles traveling on the roadway section 10.

One or more embodiments of the present invention may be compatible with embodiments described in U.S. patent application Ser. No. 17/471,470 to Sylvester, entitled SYSTEMS AND COMPUTER-IMPLEMENTED METHODS FOR ANALYZING TRANSFER OF FORCE THROUGH PAVEMENT SLABS and filed Sep. 10, 2021, which is hereby incorporated by reference in its entirety. For example, one or more embodiments of the communication elements 62 may comprise and/or be positioned and/or seated/configured similarly to components illustrated in FIGS. 14A-E such as expansion module 240 within vertical cavity 236, and/or may be in electrical communication with and/or in contact with corresponding components illustrated therein and described in connection therewith (e.g., a plug/filler material and/or connector terminal 234).

One or more embodiments of the present invention may also or alternatively be compatible with embodiments described in U.S. Pat. No. 9,856,610 to Sylvester, entitled Apparatus and method for servicing pavement and issued Jan. 2, 2018, which is hereby incorporated by reference in its entirety. For example, one or more embodiments of the communication elements 62 may comprise and/or be positioned and/or seated/configured similarly to components illustrated in FIG. 2b such as sensor 16 within port 12, and/or may be seated adjacent receiver 14 and/or relative to grouting port 20, in each case as described in the aforementioned patent.

Regardless, the communication elements 62 may establish direct and/or indirect communication(s) with communication elements 63 of vehicles for transmitting raw and/or processed data collected via the strain sensor array 40. Such data may be used in connection with autonomous and/or self-driving technologies (e.g., Level 4 autonomous driving). In an embodiment, one or more of the communication elements 62 may continuously or periodically transmit such data—i.e., regarding objects and/or vehicles present on the roadway section 10 (e.g., position, velocity, weight, etc.)—to communication elements 63 of one or more autonomous vehicles to support automated navigation. In a more particular embodiment, data obtained via the strain sensor arrays 40 of a system of roadway section 10 may comprise and/or be integrated into vehicular location, positioning, navigation, telemetry, or obstacle avoidance systems to provide and/or improve accuracy of positional data in support of autonomous driving operations.

Also or alternatively, the communication elements 62 may receive data and/or information from communication elements 63 of vehicles that are in the vicinity of, or traveling upon, the corresponding roadway section 10. The data and/or information may include velocity and/or heading information, vehicle identification information, vehicle battery status, other system information and the like. The data and/or information may be utilized by the roadway section 10 for verification purposes, fault detection or correction purposes, charging operation initiation and/or revision purposes, and the like. Additionally, or alternatively, the data and/or information, and/or commands or signals derived therefrom or based thereon, may be transferred to other roadway sections 10 in the vicinity or in the direction of travel of the vehicle.

In one or more embodiments, each roadway section 10 will include one (1), two (2), three (3), four (4), or more communication elements (e.g., wireless communication transceivers 62) embedded therein. The roadway sections 10 (which may be formed as concrete slabs) may be generally rectangular in shape, with the wireless power chargers 12 of a given roadway section 10 generally aligned with (and/or otherwise positioned adjacent to) a longitudinal centerline of the roadway section 10 (i.e., the longitudinal centerline extends through a center of the roadway section and is parallel with a y-axis of the road). Thus, with the access ports 60 and/or wireless communication transceivers 62 positioned in the corners of the roadway sections 10, the wireless communication transceivers 62 will be spaced away from the wireless power chargers 12 and/or will be radially outside of outermost edges or circumferences of each of the chargers 12 (e.g., in an XY plane), thereby avoiding interference with the EMF field generated above the top surface of the road by wireless power chargers 12. In certain specific embodiments, the wireless communication transceivers 62 will not be positioned above, or directly above (in a z-axis direction), the wireless power chargers 12 of the roadway sections 10 to ensure that interference with the generated EMF field is avoided.

In certain specific embodiments, the wireless communication transceivers 62 may comprise BLE sniffers, which are BLE transceivers configured to receive BLE signals generated and emitted from BLE beacons comprising the communication elements 63. Such BLE signals may include received signal strength indicator (RSSI) values, which comprise signal strength data indicative of the distance between the BLE beacons and the BLE sniffer. In certain embodiments, at least three (3) BLE sniffers (each spaced apart at different positions) or analogous wireless communication transceivers are required to accurately triangulate a position of a beacon (e.g., BLE beacon) via the BLE signals emanating from the BLE beacon. A more detailed description of such position-determining methodology using BLE signals is provided below. One of ordinary skill will appreciate that other types of wireless communication transceivers, such as, for example, radio-frequency identification (RFID) readers, are within the scope of the present invention.

Nevertheless, the total number, as well as the positions, of wireless communication transceivers 62 within a given roadway section 10, may be selected based at least in part on their respective intended utility and usage. For example, in connection with configuring a roadway section 10 to obtain information related to a vehicle passing over the roadway section 10, the number, size, and placement of the wireless communication transceivers 62 may be chosen to ensure the wireless communication transceivers 62 are capable of accurately detecting and identifying individual vehicles, as well as measuring the location of such vehicles.

Returning to embodiments in which the wireless communication transceivers 62 comprise BLE sniffers, the wireless communication transceivers 62 may be used to identify and/or determine at least one (1) position of a vehicle traveling on the roadway. In such embodiments, the vehicle will include a transceiver (e.g., communication element 63) that comprises a BLE beacon that continuously emits BLE signals. Also or alternatively, in one or more embodiments, an emitter (e.g., communication element 63) on a vehicle will emit similar wireless signal(s) when induced to do so by proximity to one or more of the transceiver(s) 62. When the wireless communication transceivers 62 receive the BLE signals from the vehicle's BLE beacon (e.g., communication element 63), the wireless communication transceivers 62 may transmit the BLE signals (or data indicative thereof) to the control center 14, which may directly or indirectly use the data to identify the vehicle and/or to determine a real-time and/or estimated future position of the vehicle (e.g., from the RSSI values included in the BLE signals). To accurately determine a position of the vehicle, certain embodiments require at least three (3) wireless communication transceivers 62 to be embedded within the roadway at regular, spaced apart locations within one or more of the roadway sections 10.

For example, turning to FIG. 4, two lanes (extending in the x-axis direction) of roadway are shown, with each lane comprised of two roadway sections 10 (extending in the y-axis direction, which is the travel direction of the vehicle). As illustrated, each of the roadway sections 10 includes two wireless communication transceivers 62 embedded in the roadway section 10, and particularly positioned within access ports 60 formed in the quadrants/corners of the roadway sections 10. For example, one of the wireless communication transceivers 62 of a given roadway section 10 (which may be formed as a concrete slab) is located within an access port 60 positioned in a first corner of the roadway section 10 and a second of the wireless communication transceivers 62 is located within an access port 60 positioned in a second, opposite corner of the roadway section 10. The corners are opposite, such that the first corner and the second corner are connected by a diagonal of the generally rectangularly-shaped roadway section 10.

Such positioning of the wireless communication transceivers 62 also beneficially permits accurate determinations of the positions of vehicles traveling on the roadway sections 10. Remaining with FIG. 4, each adjacent roadway section 10 includes two wireless communication transceivers 62 positioned in opposing corners of the roadway section 10. As such, each pair of adjacent roadway sections 10 (in the y-axis direction or vehicle travel direction) includes three (3) or more wireless communication transceivers 62 (and specifically four (4) wireless communication transceivers 62 in the illustrated example of FIG. 4) so as to be configured to accurately determine a position of a vehicle traveling on the roadway, as described in more detail below. For example, the nearest transceivers 62 of two (2) adjacent sections 10 may be positioned on laterally opposite sides of the sections 10 for provision of contrasting position data and enhanced vehicle location. In one or more embodiments, however, each roadway section 10 may include more than two (2) wireless communication transceivers 62. For instance, in one or more embodiments, each roadway section 10 may include four (4) wireless communication transceivers 62 (e.g., with one positioned in each corner of the roadway section 10).

In operation, the wireless communication transceivers 62 may be used to determine when and where a vehicle is traveling over a roadway associated with a wireless charging system, such that wireless power chargers 12 embedded within the roadway can be activated or tuned to transmit energy wirelessly to the vehicle to recharge the vehicle's battery.

Specifically, the wireless communication transceivers 62 may receive the BLE signals from the communication element(s) 63 of the vehicle and transmit such BLE signals and/or the RSSI values associated with such BLE signals (or data indicative of such BLE signals and/or of such RSSI values), along with a unique identifier assigned to each of the transceivers 62, to the control center 14 for processing. Specifically, the control center 14 may compare, using the processing element 20 of the control center 14 or another processing element, the BLE signals (or data indicative thereof) received from the wireless communication transceivers 62, along with data regarding the location of each transceiver 62, and perform triangulation calculations to determine the real-time and/or future position of the vehicle on the roadway based on triangulation calculation.

Because an accurate triangulation calculation generally requires three separate BLE signals (or data indicative thereof), it is generally preferable that at least three (3) separate wireless communication transceivers 62 are used to obtain BLE signals from the vehicle to accurately calculate the real-time and/or future position of the vehicle. Based on the triangulation calculations and the determined position of the vehicle, the processing element 20 of the control center 14 will cause those specific wireless power chargers 12 within the road (within the particular roadway section 10 on which the vehicle is positioned or within a downstream roadway section 10) to generate an EMF field over the top surface of the roadway, to thereby induce wireless charging in the vehicle as the vehicle is traveling on the roadway. Thus, in one or more embodiments the wireless charging of the vehicle's battery by the wireless power chargers 12 is responsive to the determination of the vehicle's position on the road, with such position being determined by the control center 14 using the data collected by the wireless communication transceivers 62 embedded within the roadway.

In one or more embodiments, the control center 14 or other computing device described herein may calculate a plurality of positions along the roadway in this manner and from the calculated positions may calculate an estimated velocity and/or speed. The control center 14 may select one or more wireless power charger(s) 12 to activate in one or more downstream sections 10 based at least in part on such an estimated velocity and estimated future position of the vehicle. In one or more embodiments, the vehicle's communication element may also or alternatively transmit data indicating the vehicle's speed and/or velocity to the wireless communication transceiver(s) 62, 24 for provision to the processing element 20.

It should be noted that other data—for example geopositional data transmitted from the vehicle to one or more of the wireless communication transceivers/receivers 62—may also or alternatively be used to determine vehicle position and/or velocity (e.g., supporting activation/deactivation of charging operations discussed below) within the scope of the present invention. It is foreseen that one or more position/velocity sensing data collection systems—e.g., sensor array(s), triangulation communication elements and/or Global Positioning System (GPS) or similar systems—may be implemented in support of charging operations discussed in more detail herein without departing from the spirit of the present invention.

Figure 7:
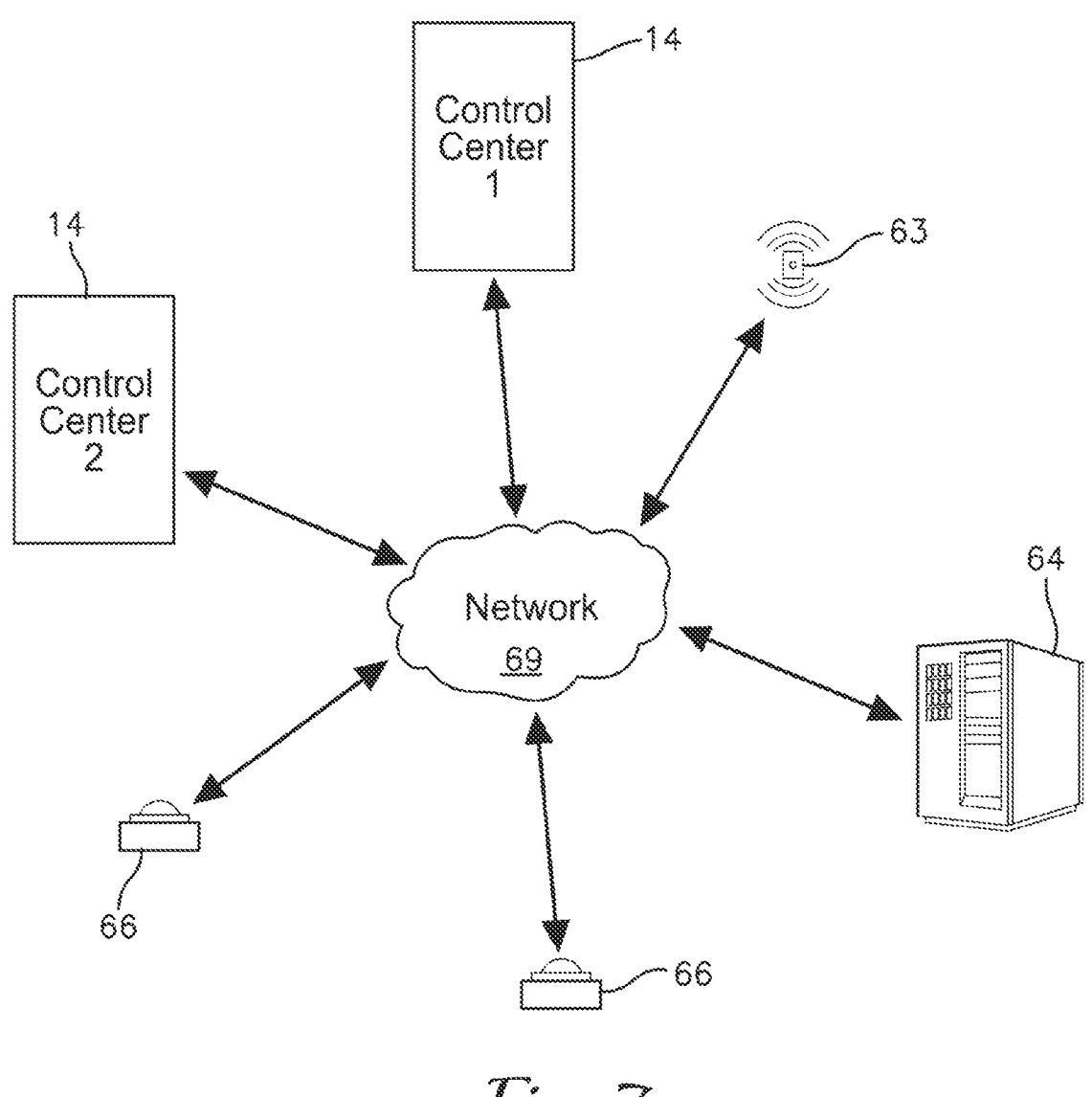
FIG. 7 is a schematic diagram of control centers of the wireless charging system of FIG. 1 and additional infrastructure sensors in communication with one or more identification and/or billing servers.

Turning now to FIG. 7, one or more embodiments of the wireless charging system include server(s) 64 for acquisition and/or processing of data supporting wireless charging and/or self-driving operations. Such data processing tasks may be shared in any proportion across, for example, the master controller of the control center(s) and/or the server(s) 64 without departing from the scope of the present invention.

Figure 8:
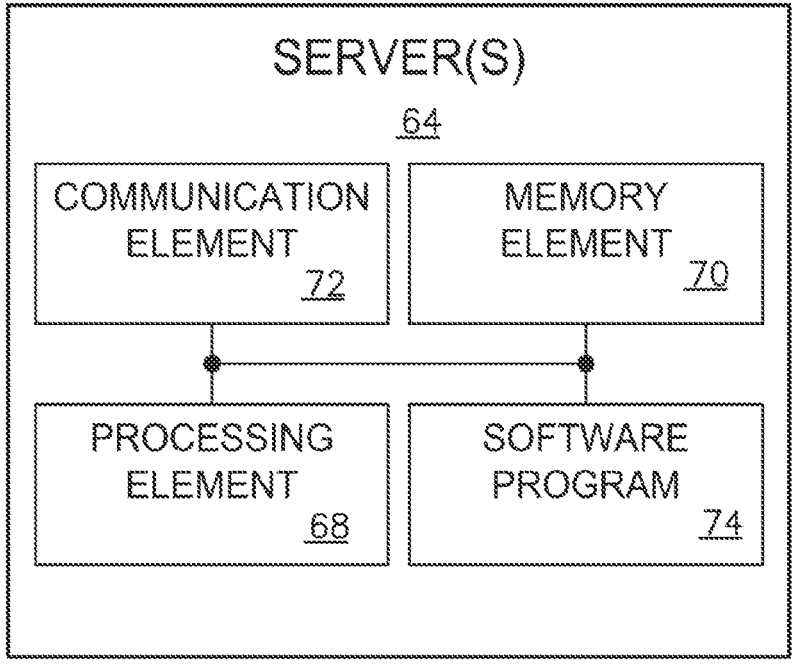
FIG. 8 is a schematic block diagram of a server of the wireless charging system from FIG. 7.

Turning now to FIG. 8, the server(s) 64 may comprise a processing element 68, a memory element 70, a communication element 72, and a software program 74, each of which is discussed in more detail below. It should also be noted that one or more components of a server 64 may be housed remotely and/or embedded in or with components of a roadway section 10 without departing from the spirit of the present invention.

The server(s) 64 may include a plurality of proxy servers, web servers, communications servers, routers, load balancers, and/or firewall servers, as are commonly known, and may comprise a cloud infrastructure and/or cloud services environment. The server(s) 64 may comprise domain controllers, application servers, database servers, file servers, mail servers, catalog servers or the like, or combinations thereof. The server(s) 64 generally implement a platform for managing receipt, storage, retrieval and analysis of real-time status data, vehicle eligibility, charge authorization/identification and/or charge profile data and information. The server(s) 64 may retain electronic data and may respond to requests to retrieve data as well as to store data.

The server(s) 64, the control center(s) 14, and internal portions of the network 69 may be located within network boundaries of an organization, such as a corporation, a government office, or the like. Other portions of the communication network 69 and the server(s) 64 may be external to the organization, for example where the server(s) 64 and/or the control center(s) 14 are individually or collectively configured to submit and request/acquire data to and from one or more third party server(s)—such as those existing within a third party cloud infrastructure environment—via application programming interface(s) (APIs) or the like.

Accordingly, the server(s) 64 and/or the control center(s) 14 may be connected to an internal network portion of the network 69, the internal network portion being managed by the organization and which may correspondingly comprise a trusted internal network or the like. Alternatively or in addition, the server(s) 64 and/or the control center(s) 14 may manage access to the APIs and/or corresponding server(s) 64 under a common authentication management framework. Each user of such an internal network may be required to complete an authentication process to submit data to and/or access or acquire data from the server(s) 64 and/or control center(s) 14.

In one or more embodiments, one or more APIs may be maintained by the server(s) 64. The APIs may include and/or provide access to one or more pages or sets of data and/or other content accessed through the World Wide Web (e.g., through the communication network 69) and/or through the internal portion(s) of the network 69, such as the database and database record(s) maintained by the server(s). The APIs may be hosted by or stored on a web server and/or database server of the server(s) 64, for example. The APIs may include and/or be access via top-level domains such as ".com", ".org", ".gov", and so forth. The APIs may be accessed using software such as a web browser, through execution of one or more script(s) for obtaining data, and/or by other means for interacting with the APIs without departing from the spirit of the present invention.

The exemplary wireless charging system of FIG. 7 may also optionally include one or more additional infrastructure sensors 66. The sensor(s) 66 may include electromagnetic radiation sensors such as cameras or optical sensors, infrared sensors, light detection and ranging (LIDAR) sensors, and other sensors embedded in or adjacent the section(s) 10. The sensor(s) 66 are configured to detect or capture data regarding the vehicle(s) traversing the section(s) 10, the section(s) themselves, and/or the components embedded in the section (s), and to relay the data to one or both of the control center(s) 14 and/or server(s) 64. For example, the sensor(s) 66 may detect and/or capture identifying symbols and/or unique identifier information from visible features or the vehicle(s), may detect vehicle position and/or type, may detect vehicle, vehicle charge and/or pavement/charger or other embedded electronic component status (e.g., by using infrared data or embedded pavement temperature sensors to identify potential system component overheating), and may otherwise gather data regarding the vehicle(s) and/or roadway for transmission to the control center(s) 14 and/or server(s) 64.

It should be noted that the term "electronic acquisition device" may be used herein to refer to any device(s)—e.g., a sensor 66, a communication element or transceiver described herein, and/or any other electronic component of the system—that is configured to generate an electronic/digital signal reflecting occurrence of a system event or status. For example, in one or more embodiments, a processing element may generate and/or receive a signal indicating that software or hardware of the system is not functioning properly and may transmit a corresponding system alert, and/or may initiate and/or revise a charging operation command, based on same.

The communication network 69 generally allows communication between the sensor(s) 66, communication elements 62, 63, other electronic components described herein, the control center(s) 14 and/or the server(s) 64. The network 69 may include the Internet, cellular communication networks, local area networks, metro area networks, wide area networks, cloud networks, plain old telephone service (POTS) networks, and the like, or combinations thereof. The network 69 may be wired, wireless, or combinations thereof and may include components such as modems, gateways, switches, routers, hubs, access points, repeaters, towers, and the like. The sensor(s) 66, communication elements 62, 63, sensor array 40, the other electronic system components, the control center(s) 14 and/or the server(s) 64 may, for example, connect to the network 69 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

The communication elements 24, 62, 63, 72 generally allow communication with systems or devices external to respective ones of the control center(s) 14, wireless communication transceiver(s) 62, 63, and server(s) 64. The communication elements 24, 62, 63, 72 may include signal or data transmitting and receiving circuits, such as antennas, amplifiers, filters, mixers, oscillators, digital signal processors (DSPs), and the like. The communication elements 24, 62, 63, 72 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication elements 24, 62, 72 may establish communication through connectors or couplers that receive metal conductor wires or cables which are compatible with networking technologies such as ethernet. The communication elements 24, 62, 72 may also couple with optical fiber cables. The communication elements 24, 62, 63, 72 may be in communication with or electronically coupled to one or more of memory elements 22, 70 and/or processing elements 20, 68.

Preferably the devices of the pavement system communicate via secure and/or encrypted communication means. For example, all or some of the roadway sections 10, control center(s) 14, wireless communication transceivers 62, 63, sensor(s) 66 and/or server(s) 64 may securely exchange transmissions using DES, 3DES, AES-128 or AES-256 encryption and/or RSA (748/1024/2048 bit) or ECDSA (256/384 bit) authentication. It is foreseen that any means for secure exchange may be utilized without departing from the spirit of the present invention.

The memory elements 22, 70 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory elements 22, 70 may include, or may constitute, a "computer-readable medium." The memory elements 22, 70 may store the instructions, code, code segments, software, firmware, programs, applications, apps, services, daemons, or the like that are executed by the processing elements 20, 68, such as the software programs 26, 74. The memory elements 22, 70 may also store settings, data, documents, files, photographs, movies, images, databases, and the like, for example where such data is captured by additional infrastructure sensors and/or relates to utilization of the wireless power chargers 12 by passing vehicles.

Vehicle eligibility and/or identification information, customer preference data or profiles, charging operation threshold(s), billing information, control logic or other criteria, and/or any associated data, may be stored in records of or otherwise in databases managed by the server(s) 64 utilizing any of a variety of formats and structures within the scope of the invention. For instance, relational databases and/or object-oriented databases may embody such databases. Also or alternatively, such database(s) may be stored and managed by or on the control center(s) 14 and/or server(s) 64. The databases may utilize a variety of formats and structures within the scope of the invention, such as Simple Object Access Protocol (SOAP), Remote Procedure Call (RPC), and/or Representational State Transfer (REST) types. One of ordinary skill will appreciate that—while examples presented herein may discuss specific types of databases—a wide variety may be used alone or in combination within the scope of the present invention.

The processing elements 20, 68 may include processors, microprocessors, microcontrollers, DSPs, field-programmable gate arrays (FPGAs), analog and/or digital application-specific integrated circuits (ASICs), or the like, or combinations thereof. The processing elements 20, 68 may include digital processing unit(s). The processing elements 20, 68 may generally execute, process, or run instructions, code, code segments, software, firmware, programs, applications, apps, processes, services, daemons, or the like. The processing elements 20, 68 may also include hardware components, such as finite-state machines, sequential and combinational logic, and other electronic circuits that may perform the functions necessary for the operation of embodiments of the present invention. For example, the processing elements 20, 68 may execute the software programs 26, 74, where the software programs 26, 74 include computer-readable instructions instructing the processing elements 20, 68 to complete all or some of the steps described herein. In one or more embodiments, one or both of software programs 26, 74 comprise control logic programs configured to control charging operations performed by a plurality of wireless power chargers 12 based at least in part on real-time status data, as discussed in more detail below. The control logic may comprise any set of rules or algorithm that takes as input, at least in part, real-time status, position, and/or health data or other information or a derivative thereof, and outputs an eligibility and/or charging operation or change to an existing charging operation designated for one or more wireless power charger(s) 12. The processing elements 20, 68 may be in communication with the other electronic components through serial or parallel links that include address busses, data busses, control lines, and the like.

Through hardware, software, firmware, or various combinations thereof, the processors or processing elements 20, 68 may—individually, in subset(s), together and/or in combination with other processing elements—be configured to perform the operations of embodiments of the present invention described herein. In one or more embodiments, the software applications/programs 26, 74 respectively include instructions executed by the processing elements 20, 68 for performance of the steps and computations described herein. In one or more embodiments, the instructions are configured for execution to perform the step(s) attributable to each device respectively according to the description of the preferred embodiments described herein.

Further, embodiments of the present invention control wireless charging of a vehicle based on data other than or in addition to vehicle position/velocity data. Namely, the wireless charging system may be configured to provide wireless charging to a vehicle based at least in part on other real-time system and/or vehicle status information, data and/or determinations. The real-time status may be compared against baseline system performance requirements and/or thresholds, against customer preference profile(s), against vehicle performance requirements and/or thresholds, and/or against other criteria to support configuration and implementation of charging operations.

For example, the real-time status data may relate to onboard electronic system status of a vehicle (e.g., comprising a battery status of the vehicle). For example, vehicle batteries that are more than fifty percent (50%) charged may be considered "sufficiently charged" or outside a general or customer preference for charging range, and not in need of wireless charging by the wireless charging system. In contrast, vehicle batteries that are less than fifty percent (50%) charged may be considered "insufficiently charged" and, thus, in need of wireless charging by the wireless charging system. As a result, in one or more embodiments, as the vehicle is traveling on the roadway, the vehicle's communication element may directly or indirectly transmit status and/or health data regarding one or more onboard electronic system(s) of the vehicle (e.g., current battery status of the vehicle) to one or more of the wireless communication transceivers 62, 24. Based on such data, the wireless charging system may (or may not) provide wireless charging to the vehicle.

For example, if the vehicle's battery status (as transmitted to the wireless communication transceiver(s) 62) is "insufficiently charged," the processing element 20 of the control center 14 will cause one or more of the wireless power chargers 12 within the road (within the particular roadway section 10 or within a downstream roadway section 10) to generate EMF field(s) to induce wireless charging in the vehicle, responsive to the vehicle's battery status. In contrast, if the vehicle's battery status is "sufficiently charged," the control center 14 will not cause wireless charging to be provided to the passing vehicle.

In another example, infrastructure sensors 66 may detect status and/or health data regarding one or more onboard electronic system(s) of the vehicle—e.g., regarding temperature of one or more of its components, damage to the vehicle, etc.—which may be passed or transmitted to the processing element 20 of the control center 14. The vehicle real-time status data may be analyzed by the processing element 20 to initiate or revise a planned charging operation. The processing element 20 may process the vehicle real-time status data by comparing it against one or more charging criteria, for example where the criteria comprise a threshold vehicle battery temperature and determination that the detected vehicle battery temperature exceeds the threshold causes reduced or no power to be supplied to the wireless power charger 12 while the vehicle passes over the wireless power charger 12.

In still another example, sensors 66 may provide real-time status data comprising data regarding the status and/or health of embedded electronic components of the system and/or other aspects of the roadway. A sensor 66 (e.g., a sensor 42) may also or alternatively be configured to detect a temperature along the roadway section 10 and/or of an embedded component, and the processing element 20 of the control center 14 may be configured to reduce or prevent supply of power to the wireless power charger 12 if the temperature exceeds one or more thresholds (e.g., where power is stepped down in inverse correlation to temperature). A sensor 66 may also or alternatively be configured to monitor the operation and status of one or more embedded electronic components (e.g., the wireless power charger 12) and provide the resulting data to the processing element 20 of the control center 14. The processing element 20 may compare the monitoring data to one or more threshold(s) and/or profile(s), and may initiate and/or revise charging operation(s) based on the comparison.

It should be noted that charging operations and revisions thereto may be tiered or attenuated (rather than binary) in embodiments of the present invention (e.g., where power is stepped down in inverse correlation to temperature, rather than being cut entirely). A sensor 66 may also or alternatively be configured to monitor the operation and status of one or more embedded electronic components (e.g., the wireless power charger 12) and provide the resulting data to the processing element 20 of the control center 14. The processing element 20 may compare the monitoring data to one or more threshold(s) and/or profile(s), and may reach corresponding charging eligibility determinations based on the comparison.

In one or more embodiments, the communication element 63 may transmit real-time status data comprising data, alerts and/or messages transmitted to the communication element (s) 62 and/or to the network 69, the transmitted data reflecting or relating to vehicle system status and/or health. In addition to battery status—which may be periodically or continuously provided to the communication element(s) of the road—the element 63 may transmit data regarding engine and/or battery temperature, data regarding battery charge efficacy (e.g., reflecting change in battery charge over time, such as during or following completion of one or more charging operation(s) along the roadway), system alert(s) such as a general command to stop, prevent or reduce power to the wireless power charger (with such alert(s) optionally including one or more reason(s) for the command), and/or other vehicle system status and/or health data, alerts and/or messages.

In one or more embodiments, other of the electronic components of the roadway itself may generate and/or transmit real-time status data comprising data, alerts and/or messages transmitted to the processing element 20 of the control center 14 reflecting or relating to roadway component system status and/or health. For example, as noted above, one or more of the wireless power charger 12, elements of the control center 14 and/or junction box 30 (e.g., the rectifier 16, inverter 18, switch 32 and/or tuning network 34), and other associated electronic components may provide such data, alerts and/or messages, in each case via wired or wireless connections.

In one or more embodiments, such feedback from one or more of the rectifier 16 and/or inverter 18 may indicate that power to the wireless power charger 12 is not being conditioned as intended according to the present charging operation(s), and any such deviation(s) that exceed an operational threshold may cause the processing element 20 of the control center 14 to stop or reduce power supply to one or more of the wireless power charger(s) 12. It should be noted that wired connections providing system status and health feedback data, alerts and/or messages need not be dedicated solely to provision of such signals, such as where wired connections or power supply wires 52 carrying power to wireless power charger(s) 12 provide a feedback signal indicative of system health and operation.

In one or more embodiments, one or a combination of two or more of the above-described criteria (e.g., triangulated position of the vehicle, vehicle eligibility, vehicle battery status or other vehicle health indicator, roadway and/or embedded electronic component health or operational indicator, or the like) may be used to determine whether or not and/or along which roadway section(s) and/or to what extent to provide wireless charging to the vehicle. Furthermore, it is contemplated that other criteria associated with the vehicle and/or of the wireless charging system may be used to determine whether or not to provide wireless charging to the vehicle.

The system may include additional, less, or alternate functionality and/or device(s), including those discussed elsewhere herein. The present detailed description is, therefore, not to be taken in a limiting sense. The scope of the present invention is defined only by the appended claims, along with the full scope of equivalents to which such claims are entitled.

Exemplary Method for Dynamic Wireless Charging

Figure 9:
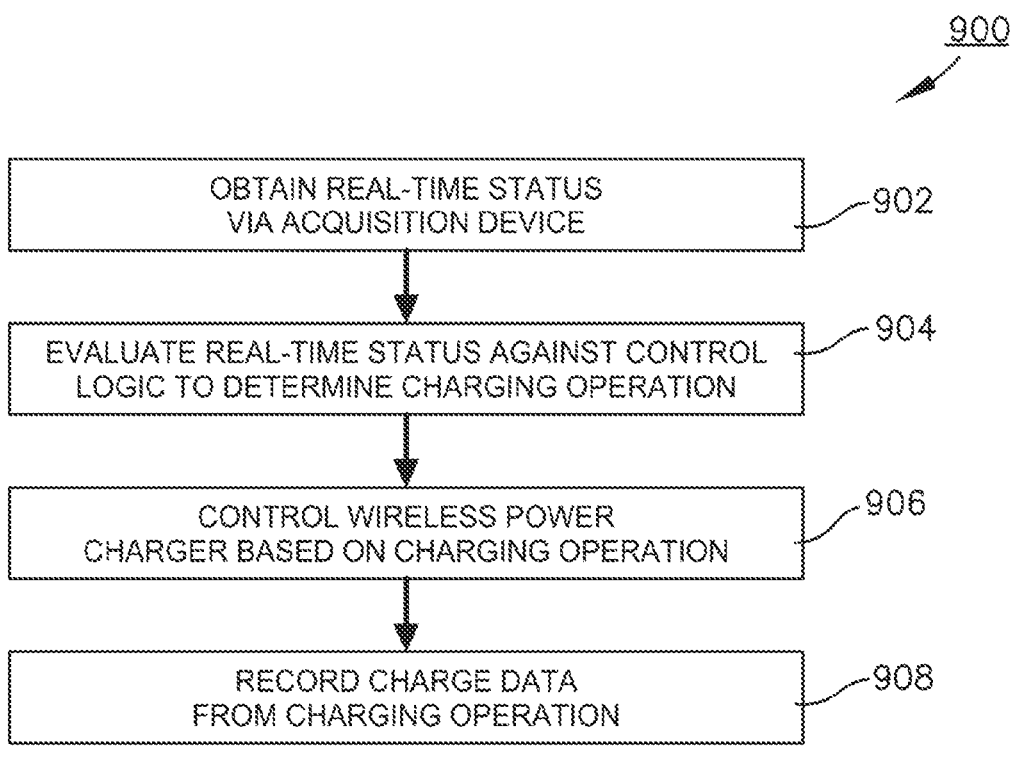
FIG. 9 depicts a flow diagram of an exemplary computer-implemented method for dynamic wireless charging, in accordance with one or more embodiments of the present disclosure.

FIG. 9 depicts a flowchart including a listing of steps of an exemplary computer-implemented method 900 for dynamic wireless charging. The steps may be performed in the order shown in FIG. 9, or they may be performed in a different order. Furthermore, some steps may be performed concurrently as opposed to sequentially. In addition, some steps may be optional.

The computer-implemented method 900 is described below, for ease of reference, as being executed by exemplary devices and components introduced with the embodiments illustrated in FIGS. 1-8. For example, the steps of the computer-implemented method 900 may be performed by one or more of the control center(s) 14, server(s) 64, the network 69 and/or wireless power charger components described herein through the utilization of processors, transceivers, hardware, software, firmware, or combinations thereof. However, a person having ordinary skill will appreciate that responsibility for all or some of such actions may be distributed differently among such devices or other computing devices, or among subsets of the foregoing, without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 902, real-time status information may be obtained via an acquisition device. The real-time status information may reflect status/health and/or operational aspects of the vehicle(s), the roadway, and/or the embedded electronic components of the dynamic wireless charging system of embodiments of the present invention.

For example, the real-time status data may be transmitted by an onboard communication element of the vehicle and may relate to one or more onboard electronic system(s) (e.g., a battery status of the vehicle). In another example, an acquisition device may comprise infrastructure sensor(s) that detect real-time status data comprising status and/or health data regarding the one or more onboard electronic system(s) of the vehicle—e.g., regarding temperature of one or more of its components, damage to the vehicle, etc.— which may be passed or transmitted to the processing element of the control center.

In still another example, infrastructure sensors may provide real-time status data comprising data regarding the status and/or health of embedded electronic components of the system and/or other aspects of the roadway. A sensor (e.g., a sensor of an embedded sensor array) may also or alternatively be configured to detect a temperature, electrical short or the like along the roadway section and/or of an embedded component. Such a sensor may also or alternatively be configured to monitor the operation and status of one or more embedded electronic components (e.g., the wireless power charger) and provide the resulting data to the processing element of the control center.

In one or more embodiments, the communication element of the vehicle may transmit real-time status data comprising data, alerts and/or messages transmitted to one or more communication element(s) of the roadway and/or to a broader communication network, with the transmitted data reflecting or relating to vehicle system status and/or health. In addition to battery status—which may be periodically or continuously provided to the control processor (e.g., of the control center)—the vehicle communication element may transmit data regarding engine and/or battery temperature, data regarding battery charge efficacy (e.g., reflecting change in battery charge over time, such as during or following completion of one or more charging operation(s) along the roadway), system alert(s) such as a general command to stop, prevent or reduce power to the wireless power charger (with such alert(s) optionally including one or more reason(s) for the command), and/or other vehicle system status and/or health data, alerts and/or messages.

In one or more embodiments, other of the electronic components of the roadway itself may generate and/or transmit real-time status data comprising data, alerts and/or messages (e.g., error messages) transmitted to the control processor (e.g., the processing element of the control center) reflecting or relating to roadway component system (e.g., hardware and/or software) status and/or health. For example, as noted above, one or more of the wireless power charger (s), elements of the control center and/or junction box (e.g., the rectifier, inverter, switch and/or tuning network), and other associated electronic components may provide such data, alerts and/or messages, in each case via wired or wireless connections. In one or more embodiments, such feedback from one or more of the rectifier and/or inverter may indicate that power to the wireless power charger is not being conditioned as intended according to the present charging operation(s). In one or more embodiments, such feedback may indicate an electrical short has occurred somewhere among the embedded components. It should be noted that wired connections providing system status and health feedback data, alerts and/or messages need not be dedicated to provision of such signals, such as where wired connections or power supply wires carrying power to wireless power charger(s) provide a feedback signal indicative of system health and operation.

As noted above, the electronic acquisition device may be a sensor (e.g., an infrastructure sensor) configured to observe and capture information regarding a physical characteristic or other aspect of the roadway, embedded electronic components and/or of the vehicle. For example, the sensor may comprise an electromagnetic radiation sensor such as an optical or infrared sensor or camera (e.g., traffic camera) embedded in or otherwise fixed to infrastructure associated with the road.

Also or alternatively, the electronic acquisition device may be or be in communication with another electronic component embedded in or associated with the roadway, such as a wireless power charger, rectifier, inverter, power supply wire or the like providing signals comprising, for example, feedback reflecting system operation.

Also or alternatively, the electronic acquisition device may comprise a communication element, such as a wireless communication transceiver operating according to standardized protocol(s) propagated under the Bluetooth™ mark by Bluetooth Special Interest Group (SIG), for example as of the date of the initial filing of the present disclosure. The wireless communication element(s) may be embedded in or otherwise fixed relative to the road, for example where the wireless communication element(s) are embedded in a section of the road proximate to and/or upstream (relative to the direction of travel of the vehicle) from a wireless power charger to be controlled based on the real-time status data. The wireless communication element(s) may establish communication with an emitter and/or transceiver mounted on the vehicle, for example according to communication protocols discussed elsewhere herein, and may receive data transmissions directly or indirectly (e.g., via a communication network such as the internet) from the vehicle emitter/transceiver. The data transmissions may include the real-time status data.

It should also be noted that a vehicle, driver and/or owner identifier may also be acquired by one or more control processors according to embodiments of the present invention. For example, the identifier may uniquely identify the individual and/or vehicle, and/or permit categorization of the individual and/or vehicle within a group, in each case sufficiently to determine whether the vehicle, driver and/or owner is/are authorized to obtain wireless vehicle charging.

The electronic acquisition device may observe the identifier and/or receive the identifier from the vehicle. In one or more embodiments, acquisition of the identifier by the electronic acquisition device may be at or near a time when the vehicle approaches or is proximate to a section of the road with the embedded wireless charger to be controlled based on the identifier. However, it should be noted that embodiments of the present invention may include earlier acquisition and storage of the identifier, preferably combined with steps for tracking the vehicle prior to reaching the section of the road with the embedded wireless charger. In one or more embodiments, tracking the vehicle following acquisition of the identifier therefrom enables prolonged association of the identifier with the vehicle and correspondingly prolonged charging authorization for the vehicle.

Referring to steps 904 and 906, the real-time status data may be evaluated against control logic to determine a charging operation and/or to control the wireless power charger based on the charging operation and/or real-time status data. In one or more embodiments, the charging operation comprises an increase, decrease, start or stop of power supply to the wireless power charger.

The control logic may comprise any set of rules or algorithm that takes as input, at least in part, the real-time status data or information or a derivative thereof, and outputs a charging operation or change to an existing charging operation.

For example, in one or more embodiments, the vehicle, owner and/or driver may be matched to a database record. The database may be configured to store, permit edits and access to and otherwise maintain at least one customer preference profile relating to charging. In one or more embodiments, a customer preference profile may dictate that vehicle batteries that are more than fifty percent (50%) charged may be considered "sufficiently charged" and not in need of wireless charging by the wireless charging system. In contrast, vehicle batteries that are less than fifty percent (50%) charged may be considered "insufficiently charged" and, thus, in need of wireless charging by the wireless charging system. As a result, in one or more embodiments, as the vehicle is traveling on the roadway, the vehicle's communication element may transmit the current battery status of the vehicle to an acquisition device comprising one or more wireless communication transceivers (e.g., embedded in the roadway and in communication with the control center(s) of the roadway), the control processor(s) may compare the battery status against the aforementioned threshold control logic, and initiate, preempt or otherwise revise a charging operation based on whether the battery status exceeds the threshold. More particularly, based on such battery status, the wireless charging system may (or may not) provide wireless charging to the vehicle. More particularly, if the vehicle's battery status (as transmitted to the acquisition device) is "insufficiently charged," the processing element of the control center will cause one or more of the wireless power chargers within the road (within the particular roadway section or within a downstream roadway section) to generate EMF field(s) to induce wireless charging in the vehicle, responsive to the vehicle's battery status. In contrast, if the vehicle's battery status is "sufficiently charged," the control center will not cause wireless charging to be provided to the vehicle.

For another example involving onboard electronic system real-time status data, battery temperature data (e.g., obtained via the vehicle's transmitter and/or infrastructure sensor(s)) may be obtained and the control processor may compare the vehicle battery temperature against one or more temperature threshold(s) of the control logic. The control processor (e.g., of the control center) may be configured to reduce or prevent supply of power to the wireless power charger if the temperature exceeds one or more thresholds (e.g., where power is stepped down in inverse correlation to temperature).

For still another example, embedded sensor(s) may monitor detectable physical aspects of embedded electronic components (e.g., wireless power charger temperature, power supply line temperature, etc.), compare the resulting sensor output to one or more threshold(s) and/or profile(s) of the control logic, and initiate and/or revise charging operation(s) based on the comparison. In one or more embodiments, the control processor (e.g., of the control center) may be configured to reduce or prevent supply of power to the wireless power charger if the temperature of the wireless power charger exceeds one or more thresholds (e.g., where power is stepped down in inverse correlation to temperature).

The database for customer preference profiles and/or control logic storage may be managed locally, for example by a processing element of a control center adjacent to the road. Also or alternatively, the database may be managed remotely, for example where such a control center is in electronic communication with remote server(s) performing database management. It is foreseen that, in one or more embodiments, steps of the control logic access and comparison operations set out herein may be performed by or across multiple such devices, or by other electronic devices, within the scope of the present invention.

The charging operation may be initiated, preempted or otherwise revised upon receipt of the real-time status data and comparison against the corresponding control logic, or the control processor may delay the charging operation or change thereto. The delay may be based, for example, on vehicle position and/or velocity, which may be determined, for example, from geopositional (e.g., GPS) data, from position and/or velocity calculations based on data from one or more embedded sensor array(s), and/or from triangulation calculation(s) utilizing wireless communication element(s) described in more detail above.

In one or more embodiments, where the control processor performs the comparison against control logic before the vehicle reaches a charging zone above the wireless power charger, the control processor may embed a delay into the command for the corresponding charging operation. One of ordinary skill will appreciate, however, that no delay may be built into initiation of the charge operation, for example where implementation of a delay is known to reduce quality of service (e.g., based on latency limitations or the like), where the average vehicle passes into the charging zone with proper timing and without need for delay, and/or in other circumstances.

Any delay for the charging operation or revision thereto may comprise a pre-determined value configured to represent the average delay corresponding to when the average vehicle would be expected to reach the charging zone following a benchmark event (e.g., following comparison against the control logic). For example, where the real-time status data are acquired at a known time from sensor(s) and/or wireless communication element(s) having known position along the road, and where average vehicle speed is known or assumed, a pre-determined value for delay may be calculated and implemented by the control processor.

Also or alternatively, where vehicle position and/or velocity are known (e.g., based on sensor data, triangulation data and/or geopositional data received from the vehicle) or inferred (e.g., based on the timing of when the real-time status data were received or sensed by the system), a delay may be dynamically calculated for the charging operation for the vehicle. For example, where vehicle position and velocity are known relative to the wireless power charger, the control processor may calculate one or more estimated delays before the vehicle reaches the charging zone for the wireless power charger. Moreover, where the vehicle position and velocity are periodically or continually reassessed by the sensor(s) and/or wireless communication element(s), the delay may be dynamically updated. Also or alternatively, the delay may be replaced by a trigger, e.g., where the charge operation is automatically initiated once the vehicle is determined in real-time to have reached the charging zone.

It should be noted that the sensor(s), reporting electronic component(s) and/or wireless communication element(s) acting as the acquisition device(s) may be fixed to, embedded in or otherwise associated with one or more roadway segments upstream (in the direction of travel) from the vehicle for which the charge authorization is determined. For example, and with reference to FIG. 1, first acquisition device(s) may be associated with a first roadway segment upstream in the direction of travel (along the y-axis). The first acquisition device(s) may capture the real-time status data as the vehicle travels along or proximate to the first roadway segment. The output of the comparison of the real-time status data to control logic may be generated by the control processor (e.g., of one or more of the control center(s) proximate the roadway) while the vehicle traverses the first segment, a second downstream segment, or a third downstream segment in which the wireless power charger is embedded. The control processor may initiate, preempt or otherwise revise the corresponding charging operation with or without a delay reflecting the actual or anticipated period of time required before the vehicle reaches the charging zone for the wireless power charger embedded in the third segment. Also or alternatively, the control processor may trigger the charging operation when the first and/or one or more second acquisition device(s) (e.g., second sensor(s) and/or wireless communication element(s) associated with the second and/or third roadway segment(s)) sense or otherwise determine the approach or proximity of the vehicle to the charging zone of the wireless power charger.

It should also be noted that vehicle(s) may behave unpredictably. For example, other vehicles may reach the wireless power charger before the charging operation can be performed on the vehicle, and/or the vehicle may itself move unpredictably out of alignment with its expected or extrapolated position(s).

Accordingly, in one or more embodiments, the position(s) of the vehicle for which the charging operation has been determined may be tracked following generation of the charging operation determination. In this manner, the real-time status data may "follow" the vehicle along the roadway for so long as the corresponding control logic does not output a different charging operation determination and/or the vehicle or other traffic move unpredictably. Accordingly, the real-time status data may persist across multiple roadway section(s) and/or wireless power charger(s) without the need to reacquire same and/or to reperform all or some of the underlying operations that led to the output of the control logic.

Also or alternatively, identifying characteristics for the vehicle (e.g., characteristics for which data is easily gathered and/or classified) may be selected, and additional downstream sensor(s) and/or wireless communication element(s) may periodically or continuously reacquire data regarding such identifying characteristics, again enabling the real-time status data to "follow" the vehicle along the roadway for the purposes described in this paragraph without the need for reacquisition and/or reassessment.

In one or more embodiments, multiple charging operations for the wireless power charger and/or across multiple power chargers in the roadway may be initiated, preempted or otherwise revised based at least in part on the real-time status data and/or the corresponding output of the control logic comparison(s). For example, the control processor may initiate a cascade or sequence of charge operations based on one or relatively few control logic output(s) and/or on vehicle position and/or velocity tracking, such as where multiple wireless power chargers (e.g., spanning multiple roadway segments) are activated and deactivated in sequence according to pre-determined and/or dynamically determined timing.

It should also be noted that the at least one control processor may incorporate additional control logic based at least in part on additional data received from the vehicle (e.g., via transmission(s) from onboard wireless communication element(s)). For example, and as discussed above, the at least one control processor may condition one or more charging operation(s) on determinations of eligibility to receive charging, a combination of multiple real-time status data types described herein, or on other data and/or determinations within the scope of the present invention.

Also or alternatively, the control processor may incorporate control logic based at least in part on the position(s) and/or status(es) of additional vehicles when calculating, initiating and/or implementing charging operations, corresponding timing mechanisms and the like, such as where the control processor overrides a reduction of power supplied to the wireless power charger that would otherwise result from passage of the present vehicle beyond the charging zone, with the override resulting from a determination by the control processor that another vehicle that is to be charged has entered or will soon enter the charging zone. Alternatively formulated, the control logic may condition reduction of the power supply to the wireless power charger on the absence of approaching vehicles having need and qualification for charge.

A variety of charging operations, corresponding timing mechanisms and position determinations, co-dependent control logic and other operations are within the scope of the present invention.

In one or more embodiments, the control processor controlling the wireless power charger based on the real-time status data is housed in a local control center in electronic communication with the wireless power charger. It is foreseen that the control processor may be housed remotely and in electronic communication with the wireless power charger without departing from the spirit of the present invention. Moreover, the data relating to updated charging operation initiation command(s), preemption, delay(s), position tracking and other aspects described above may be stored in the database or another database managed by local control center(s), remote server(s) and/or in other location(s) within the scope of the present invention. It is also foreseen that one or more of the control or storage steps or operations described herein may be performed across one or more of the local control center(s), remote server(s) or other computing device(s) within the scope of the present invention.

Referring to step 908, the at least one control processor may record data regarding charge provided to or withheld from the vehicle based on the real-time status data. For example, the data may reflect one or more of: timestamp(s) corresponding to time of real-time status data acquisition; time of initiation of a corresponding charging operation; time of ending or reversal of a corresponding charging operation; duration of a corresponding charging operation; the real-time status data itself; charge level(s) and/or changes thereto for a battery of the corresponding vehicle, e.g., as reflected in data received from the vehicle; current, voltage or other electrical measure of power made available and/or provided to the vehicle during the corresponding charging operation; one or more monetary value(s) corresponding to or financial charge(s) for the electrical updated charging operation(s) corresponding to the real-time status data; refusal to provide charge based on the real-time status data; and/or other data capturing aspects of the charging operation(s) carried out based on the real-time status data.

The data regarding charge provided to or withheld from the vehicle based on the real-time status data may be gathered and/or generated locally at a control processor of one or more control center(s) in electronic communication with the wireless power charger. The data may also or alternatively be gathered and/or generated remotely at a control processor of one or more remote server(s). Moreover, the data may be stored locally or remotely on such devices or other devices within the scope of the present invention. For example, the data regarding charge provided to or withheld from the vehicle based on the real-time status data may be stored in the database record for the vehicle matched to the vehicle, owner and/or driver as described in detail above, and/or may be transmitted and/or made accessible to one or more third party computing devices responsible for performing billing processes, within the scope of the present invention.

The method may include additional, less, or alternate steps and/or device(s), including those discussed elsewhere herein.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Additional Considerations

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

All patent applications, patents, and printed publications cited herein are incorporated herein by reference in the entireties, except: for any definitions, subject matter disclaimers or disavowals therein; for statements, omissions or representations made during prosecution, on appeal, or in post-grant proceedings or litigation relating thereto; and to the extent that the incorporated material is inconsistent with the express disclosure herein, in which case the language in this disclosure controls.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A wireless charging system for a road, said wireless charging system comprising:
a wireless power charger embedded within the road, wherein the wireless power charger is configured to induce wireless charging in a vehicle;
an electronic acquisition device comprising a sensor, the sensor comprising a strain sensor array embedded within the road, the strain sensor array including a further sensor, the further sensor being configured to generate real-time status data reflecting a status of at least one of a plurality of electronic components embedded within the road, the strain sensor array being configured to obtain vehicle position data regarding the vehicle traveling on the road; and
at least one control processor in communication with the electronic acquisition device and the wireless power charger, wherein the at least one control processor is configured to control the wireless power charger based on the vehicle position data generated by the strain sensor array and based on the real-time status data generated by the further sensor.

2. The wireless charging system of claim 1, further comprising an infrared sensor in communication with the at least one control processor, wherein— the infrared sensor is configured to obtain a temperature estimate for an electronic component of the vehicle,
the at least one control processor is configured to control the wireless power charger based at least in part on comparison of the temperature estimate to a threshold temperature.

3. The wireless charging system of claim 1, wherein—
the electronic acquisition device includes a communication element,
the communication element is configured to obtain a temperature for an electronic component of the vehicle from a transmission from the vehicle, and
the at least one control processor is configured to control the wireless power charger based at least in part on comparison of the temperature to a threshold temperature.

4. The wireless charging system of claim 1, wherein—
the electronic acquisition device includes a communication element,
the communication element is configured to obtain a battery status for the vehicle from a transmission from the vehicle, and
the at least one control processor is configured to control the wireless power charger based at least in part on comparison of the battery status to a charging range.

5. The wireless charging system of claim 1, wherein—
the electronic acquisition device includes a communication element,
the communication element is configured to receive an identifier in a transmission from the vehicle,
the at least one processor is configured to determine a charge authorization based on the identifier, and
the at least one control processor is configured to control the wireless power charger based on the charge authorization.

6. The wireless charging system of claim 5, wherein—
the charge authorization is determined by the at least one control processor based on matching the identifier to a database record and, based on the matching, determining whether the vehicle is authorized for charging.

7. The wireless charging system of claim 6, wherein—
the database record references an individual account having a valid billing status, and
the at least one control processor is further configured to record data regarding the control of the wireless power charger based on the onboard electronic system status data and to transmit the recorded data for association with the individual account.

8. The wireless charging system of claim 7, wherein—
the at least one control processor includes a processing element housed in a control center adjacent the road,
the at least one control processor includes a processing element housed in a remote server and in electronic communication with the processing element of the control center,
the processing element of the remote server is configured to manage a database including the database record, and
the processing element of the remote server is configured to cause transmission of a charge approval containing the charge authorization to the processing element of the control center if the matching results in a determination that the vehicle is authorized for charging.

9. The wireless charging system of claim 1, wherein—
the electronic acquisition device includes a communication element, at least one of a plurality of electronic components embedded within the road are configured to transmit to the communication element further real-time status data reflecting a further status of the one or more of the plurality of electronic components, and the at least one control processor is configured to control the wireless power charger based on the further real-time status data.

10. The wireless charging system of claim 9, wherein— the further real-time status data includes a system alert from the at least one of the plurality of embedded electronic components, and the control by the at least one control processor of the wireless power charger includes cutting power to the wireless power charger based on the system alert.

11. The wireless charging system of claim 1, wherein— the at least one control processor is configured to control the wireless power charger based on one or both of the following data types: a vehicle identifier, and a vehicle battery status.

12. The wireless charging system of claim 1, wherein— the control of the wireless power charger by the at least one control processor includes determining, via the at least one control processor, a charge start delay based on the vehicle position data.

13. The wireless charging system of claim 12, wherein— the determination of the charge start delay is also based on a speed of the vehicle.

14. The wireless charging system of claim 13, wherein the speed of the vehicle is extracted from the vehicle position data, and the vehicle position data is transmitted from the vehicle and received by a communication element in communication with the at least one control processor.

15. The wireless charging system of claim 12, wherein the vehicle position data is generated based on at least one transmission from the vehicle received by a communication element in communication with the at least one control processor.

16. The wireless charging system of claim 1, wherein— the electronic acquisition device includes a communication element, and the communication element is configured to receive a vehicle system alert from the vehicle, the at least one control processor is configured to cut power to the wireless power charger based on the vehicle system alert.

17. The wireless charging system of claim 1, wherein— the real-time status data includes a system alert from the at least one of the plurality of embedded electronic components, and the control by the at least one control processor of the wireless power charger includes cutting power to the wireless power charger based on the system alert.

* * * * *